(12) United States Patent
Lyu et al.

(10) Patent No.: US 11,782,979 B2
(45) Date of Patent: Oct. 10, 2023

(54) METHOD AND APPARATUS FOR VIDEO SEARCHES AND INDEX CONSTRUCTION

(71) Applicant: Alibaba Group Holding Limited, Grand Cayman (KY)

(72) Inventors: Yiliang Lyu, Hangzhou (CN); Mingqian Tang, Hangzhou (CN); Zhen Han, Hangzhou (CN); Yulin Pan, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 284 days.

(21) Appl. No.: 17/114,922

(22) Filed: Dec. 8, 2020

(65) Prior Publication Data

US 2021/0200802 A1    Jul. 1, 2021

(30) Foreign Application Priority Data

Dec. 30, 2019    (CN) .......................... 201911398726.4

(51) Int. Cl.
| | |
|---|---|
| *G06F 16/73* | (2019.01) |
| *G11B 27/10* | (2006.01) |
| *G06F 16/71* | (2019.01) |
| *G06F 40/30* | (2020.01) |
| *G06V 20/40* | (2022.01) |

(52) U.S. Cl.
CPC .............. *G06F 16/73* (2019.01); *G06F 16/71* (2019.01); *G06F 40/30* (2020.01); *G06V 20/41* (2022.01); *G06V 20/49* (2022.01); *G11B 27/10* (2013.01); *G06V 2201/10* (2022.01)

(58) Field of Classification Search
CPC ................................. G06F 16/73; G06F 16/71
See application file for complete search history.

(56) References Cited

U.S. PATENT DOCUMENTS

| | | |
|---|---|---|
| 6,125,229 A | 9/2000 | Dimitrova et al. |
| 6,678,389 B1 | 1/2004 | Sun et al. |
| 8,189,685 B1 | 5/2012 | Choudhry et al. |
| 8,364,673 B2 | 1/2013 | Chang et al. |
| 8,370,869 B2 | 2/2013 | Paek et al. |
| 8,387,087 B2 | 2/2013 | Girouard et al. |
| 8,855,468 B2 | 10/2014 | Zetterower et al. |
| 9,031,974 B2 | 5/2015 | Delgo et al. |
| 9,330,722 B2 | 5/2016 | Chang et al. |
| 9,396,763 B2 | 7/2016 | Syed et al. |
| 9,508,011 B2 | 11/2016 | Sharon et al. |
| 2010/0082585 A1 | 4/2010 | Barsook et al. |
| 2012/0008821 A1 | 1/2012 | Sharon et al. |
| 2015/0046537 A1 | 2/2015 | Rakib |
| 2015/0339348 A1* | 11/2015 | Joo ........................ G06F 16/433 707/722 |
| 2017/0060858 A1 | 3/2017 | Sharp |
| 2019/0392009 A1* | 12/2019 | Kang ..................... G06F 16/433 |

\* cited by examiner

*Primary Examiner* — Baoquoc N To
(74) *Attorney, Agent, or Firm* — James J. DeCarlo; Greenberg Traurig, LLP

(57) ABSTRACT

Embodiments of the disclosure provide methods and apparatuses for video searches and methods and apparatuses for index construction. In one embodiment, the method comprises: upon receiving a search request input by a user to search for a target video, processing, based on a pre-configured algorithm, multimodal search data for the target video included in the search request; providing a processing result of the multimodal search data with regard to a corresponding pre-constructed index to search to obtain the target video.

21 Claims, 13 Drawing Sheets

METHOD AND APPARATUS FOR VIDEO SEARCHES AND INDEX CONSTRUCTION

CROSS-REFERENCE TO RELATED APPLICATIONS

The present application claims priority to the Chinese Patent Application No. 201911398726.4 filed on Dec. 30, 2019, which is incorporated by reference herein in its entirety.

BACKGROUND

Technical Field

Embodiments of the disclosure relate to the field of computer technology, and in particular, to methods, apparatuses, computing devices, and computer-readable media for video searches, as well as methods, apparatuses, computing devices, and computer-readable media index construction.

Description of Related Art

With the ever-increasing popularization and development of video networks, numerous video websites have emerged, making it easy for users to search for and watch videos on video websites, thereby greatly enriching users' lives.

Presently, most video searches are based on the textual information associated with the videos. For example, a search for a video can be performed by inputting a video name on a video website. However, given that many videos have the same name when a user inputs a video name, several video search results will be retrieved, through which the user must click through to watch to obtain the video the user intends to watch. As such, the present search technologies have relatively low accuracy and consequently degrade user experiences.

Therefore, there exists a need to improve the accuracy of video searches.

SUMMARY

Embodiments of the disclosure provide methods, apparatuses, computing devices, and computer-readable media for video searches, as well as methods, apparatuses, computing devices, and computer-readable media for index construction.

In one embodiment, the disclosure provides a method for video searches, the method comprising: receiving a search request input by a user to search for a target video, the search request including multimodal search data for the target video; processing the multimodal search data based on a pre-configured algorithm to obtain a processing result of the multimodal search data; and providing the processing result of the multimodal search data with regard to a corresponding pre-constructed index; to search to obtain the target video.

In one embodiment, the multimodal search data comprises text data; and the processing of the multimodal search data based on to obtain a processing result of the multimodal search data comprises: processing the text data based on a pre-configured text algorithm to obtain a semantic text label of the text data.

In one embodiment, the multimodal search data comprises image data; and the processing of the multimodal search data to obtain a processing result of the multimodal search data based on comprises: processing the image data based on a pre-configured image algorithm to obtain a semantic image label of the image data; and processing the image data a pre-configured vectorization model to obtain a vectorized description of the image data.

In one embodiment, the multimodal search data comprises video data; and before processing the multimodal search data to obtain a processing result of the multimodal search databased on, the method further comprising: processing the video data into video metadata and video stream data; and segmenting the video stream data into a sequence of video frames based on a pre-configured segmentation manner.

In one embodiment, the processing of the multimodal search data to obtain a processing result of the multimodal search data based on comprises: processing the video metadata based on a text algorithm to obtain a semantic text label of the video metadata; processing video frames in the sequence of video frames based on a pre-configured video algorithm to obtain semantic video labels of the video frames; and processing the video frames based on a vectorization model to obtain vectorized descriptions of the video frames.

In one embodiment, providing the processing result of the multimodal search data with regard to a corresponding pre-constructed index to search to obtain the target video comprises: providing the semantic text label of the text data with regard to a corresponding pre-constructed inverted index to search to obtain the target video.

In one embodiment, providing the processing result of the multimodal search data with regard to a corresponding pre-constructed index to search to obtain the target video comprises: providing the semantic image label with regard to a corresponding pre-constructed inverted index to search to obtain a first initial video; providing the vectorized description of the image data with regard to a corresponding pre-constructed vector index to search to obtain a second initial video; and obtaining the target video based on the first initial video and the second initial video.

In one embodiment, providing the processing result of the multimodal search data with regard to a corresponding pre-constructed index to search to obtain the target video comprises: providing the semantic text label of the video metadata with regard to a corresponding pre-constructed inverted index to search to obtain a third initial video; providing the vectorized descriptions of the video frames with regard to a corresponding pre-constructed vector index to search to obtain a fourth initial video; and obtaining the target video based on the third initial video and the fourth initial video.

In one embodiment, providing the semantic image label with regard to a corresponding pre-constructed inverted index to search to obtain a first initial video comprises: combining the semantic image label and the semantic text label of the text data to generate a combined label and providing the combined label with regard to the corresponding pre-constructed inverted index to search to obtain the first initial video.

In one embodiment, providing the semantic text label of the video metadata with regard to a corresponding pre-constructed inverted index to search to obtain a third initial video comprises: combining the semantic text label of the video metadata and the semantic text label of the text data to generate a combined label and providing the combined labels with regard to the corresponding pre-constructed inverted index to search to obtain the third initial video.

In one embodiment, obtaining the target video based on the first initial video and the second initial video comprises:

comparing the first initial video and the second initial video to remove a duplicated video; recalculating the first initial video and second initial video to obtain target scores of the first initial video and second initial video; and ranking the first initial video and the second initial video based on the target scores to obtain the target video.

In one embodiment, obtaining the target video based on the third initial video and the fourth initial video comprises: comparing the third initial video and the fourth initial video to remove a duplicated video; recalculating the third initial video and fourth initial video to obtain target scores of the third initial video and fourth initial video; and ranking the third initial video and fourth initial video based on the target scores to obtain the target video.

In one embodiment, the index is constructed b: obtaining video data; processing the video data into video metadata and video stream data; processing the video metadata based on a pre-configured text algorithm to obtain a text processing result of the video metadata; processing the video stream data based on a pre-configured video algorithm and vectorization model respectively to obtain a video processing result and a vectorization processing result of the video stream data; constructing an inverted index based on the text processing result and the video processing result, and constructing a vector index based on the vectorization processing result.

In one embodiment, the disclosure provides a method for video searches, the method comprising: receiving multimodal search data input by a user, the multimodal search data including text data, image data, video data, and/or audio data; obtaining a processing result of the multimodal search data based on the multimodal search data; and providing the processing result of the multimodal search data with regard to a corresponding pre-constructed index to search to obtain a target video associated with the multimodal search data.

In one embodiment, the disclosure provides a method for index construction, the method comprising: obtaining video data; processing the video data into video metadata and video stream data processing the video metadata based on a pre-configured text algorithm to obtain a text processing result of the video metadata; processing the video stream data based on a pre-configured video algorithm and vectorization model respectively to obtain a video processing result and a vectorization processing result of the video stream data; constructing an inverted index based on the text processing result and the video processing result, and constructing a vector index based on the vectorization processing result.

In one embodiment, the processing of the video metadata based on a pre-configured text algorithm to obtain a text processing result of the video metadata comprises: processing the video metadata based on the pre-configured text algorithm to obtain a semantic text label of the video metadata.

In one embodiment, before the processing of the video metadata based on the pre-configured text algorithm to obtain a semantic text label of the video metadata, the method further comprises: segmenting the video stream data into a sequence of video frames based on a pre-configured segmenting manner.

In one embodiment, the processing of the video stream data based on a pre-configured video algorithm and vectorization model, respectively, to obtain a video processing result and a vectorization processing result of the video stream data comprises processing video frames in the sequence of video frames based on a pre-configured video algorithm to obtain semantic video labels of the video frames and processing the video frames based on the pre-configured vectorization model to obtain vectorized descriptions of the video frames.

In one embodiment, constructing an inverted index based on the text processing result and the video processing result and constructing a vector index based on the vectorization processing result comprises constructing the inverted index based on the semantic text label and the semantic video labels and constructing the vector index based on the vectorized descriptions.

In one embodiment, the disclosure provides an apparatus for video searches, the apparatus comprising: a search request receiving module configured to receive a search request input by a user to search for a target video, the search request including multimodal search data for the target video; a multimodal search data processing module configured to process the multimodal search data based on a pre-configured algorithm to obtain a processing result of the multimodal search data; and a target video searching module configured to provide the processing result of the multimodal search data with regard to a corresponding pre-constructed index to search to obtain the target video.

In one embodiment, the disclosure provides an apparatus for video searches, the apparatus comprising: a search data receiving module configured to receive multimodal search data input by a user, the multimodal search data comprising text data, image data, video data, and/or audio data; a data processing result obtaining module configured to obtain a processing result of the multimodal search data based on the multimodal search data; and an associated video obtaining module configured to provide the processing result of the multimodal search data with regard to a corresponding pre-constructed index to search to obtain a target video associated with the multimodal search data.

In one embodiment, the disclosure provides an apparatus for index construction, the apparatus comprising: a video data obtaining module configured to obtain video data and process the video data into video metadata and video stream data; a video metadata processing module configured to process the video metadata based on a pre-configured text algorithm to obtain a text processing result of the video metadata; a video stream processing module configured to process the video stream data based on a pre-configured video algorithm and vectorization model, respectively, to obtain a video processing result and a vectorization processing result of the video stream data; and a heterogeneous index constructing module configured to construct an inverted index based on the text processing result and the video processing result, and construct a vector index based on the vectorization processing result.

In one embodiment, the disclosure provides an apparatus for a computing device is provided, comprising a memory and a processor, wherein the memory is configured to store computer-executable instructions, and the processor is configured to execute the computer-executable instructions so as to perform the following: receiving a search request inputted by a user to search for a target video, the search request carrying multimodal search data for the target video; processing the multimodal search data based on a pre-configured algorithm to obtain a processing result of the multimodal search data; and inputting the processing result of the multimodal search data to a corresponding pre-constructed index, and performing a search to obtain the target video.

In one embodiment, the disclosure provides a computing device for video searches, the computing device comprising: a memory and a processor, wherein the memory is configured to store computer-executable instructions that, when executed by the processor, cause the computing device to perform the following: receiving multimodal search data input by a user, the multimodal search data including text data, image data, video data, and/or audio data; obtaining a processing result of the multimodal search data based on the multimodal search data; and providing the processing result of the multimodal search data with regard to a corresponding pre-constructed index to search to obtain a target video associated with the multimodal search data.

In one embodiment, the disclosure provides a computing device for index construction, the computing device comprising: a memory and a processor, wherein the memory is configured to store computer-executable instructions that, when executed by the processor, cause the computing device to perform the following: obtaining video data and process the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; and constructing an inverted index based on the text processing result and the video processing result and constructing a vector index based on the vectorization processing result.

In one embodiment, the disclosure provides a computer-readable storage medium for storing computer-executable instructions that, when executed by a processor, implement the steps of the video search methods or the index construction methods of the disclosure as described.

Embodiments of the disclosure provide methods and apparatuses for video searches. According to some embodiments, the method for video searches comprises: upon receiving a search request input by a user to search for a target video, processing, based on a pre-configured algorithm, multimodal search data for the target video included in the search request; and providing a processing result of the multimodal search data with regard to a corresponding pre-constructed index to search to obtain the target video. This way, the target video is obtained quickly and accurately based on the multimodal search data, thereby improving user experiences.

DETAILED DESCRIPTION

Details are described below to facilitate a full understanding of the disclosure. However, the disclosure can be implemented in many other ways different from those described herein, and those skilled in the art can make similar modifications without departing from the spirit of the disclosure. Therefore, the disclosure is not limited by the specific embodiments described below.

The terms used in one or more embodiments of the disclosure are only used for illustrative purposes of describing specific embodiments and are not intended to be limiting. The singular forms "a," "said," and "the" used in one or more embodiments of the disclosure and in the appended claims are also intended to include plural forms unless the context clearly indicates otherwise. It should also be understood that the term "and/or" used in one or more embodiments of the disclosure refers to and includes any or all possible combinations of one or more associated listed items.

It should be understood that although the terms "first, second, etc." may be used to describe various types of information in one or more embodiments of the disclosure, such information should not be limiting. These terms are only used to distinguish one type of information from another type of information. For example, without departing from the scope of one or more embodiments of the disclosure, the "first" may also be referred to as the "second," and similarly, the "second" may also be referred to as the "first." Depending on the context, the word "if" as used herein may be construed to mean "when . . ." or "upon . . ." or "in response to determining."

As used herein, a heterogeneous search engine refers to a search engine that includes both an inverted index (text retrieval) and a vector index (video/image retrieval).

As used herein, multimodal search data refers to data of different modalities in terms of content representation (e.g., text, image, video, etc.).

Figure 1A:
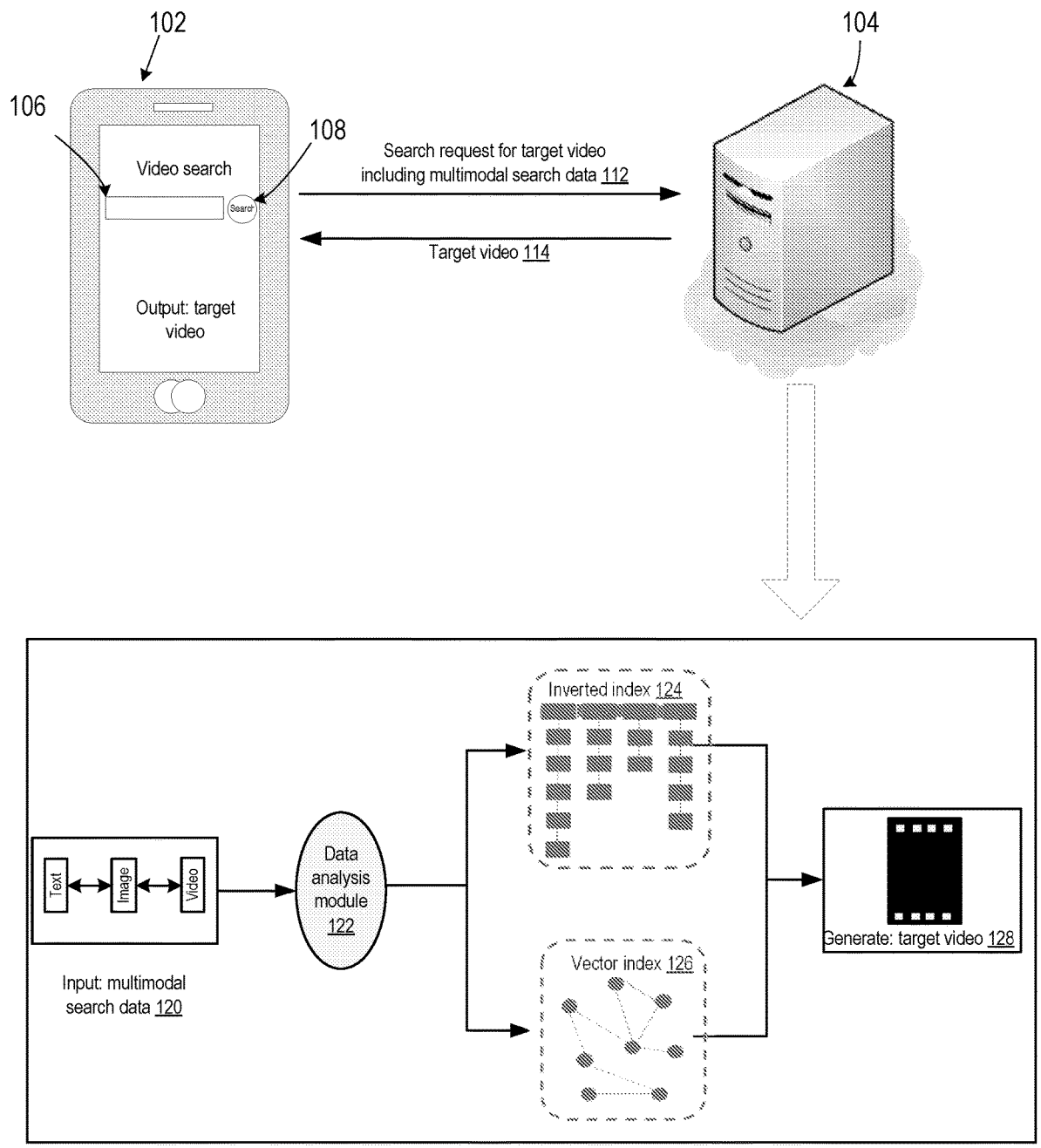
FIG. 1A is a schematic diagram illustrating an application scenario of video searches according to some embodiments of the disclosure.
Figure 1B:
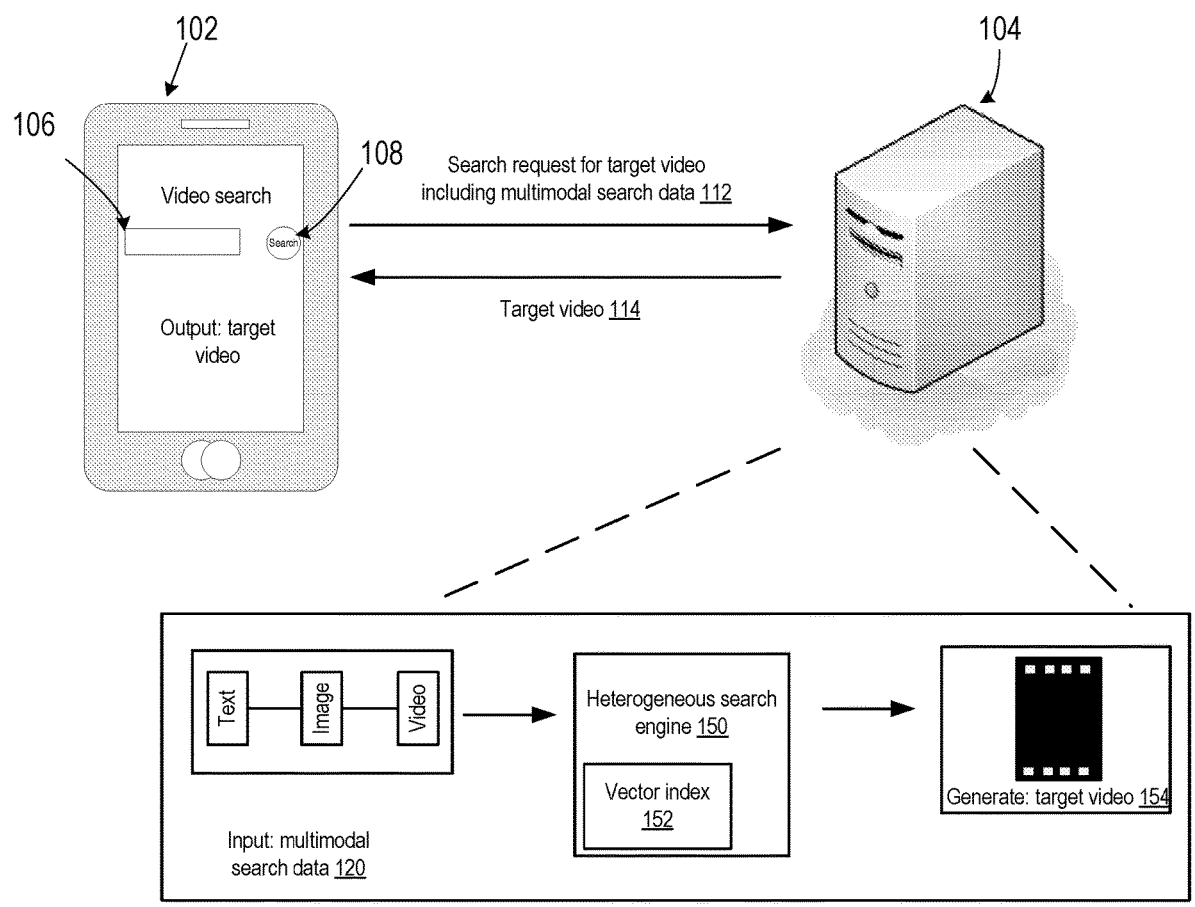
FIG. 1B is a schematic diagram illustrating an application scenario of video searches according to some embodiments of the disclosure.
Figure 2A:
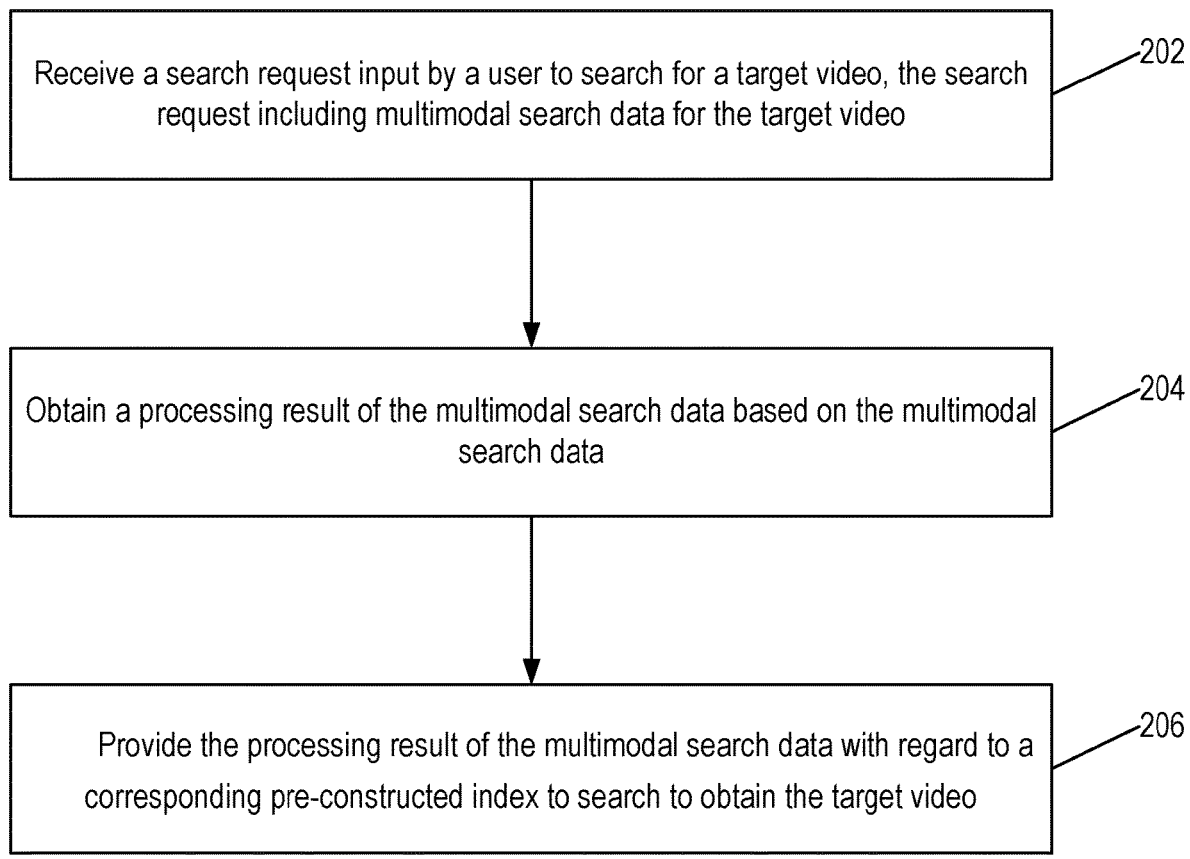
FIG. 2A is a flow diagram illustrating a method for video searches according to some embodiments of the disclosure.

FIGS. 1A and 1B are schematic diagrams illustrating application scenarios for video searches, according to embodiments of the disclosure. FIG. 2A is a flow diagram illustrating a method for searching videos according to some embodiments of the disclosure. The following illustrates the video searches of FIGS. 1A-B with reference to FIG. 2A. In some embodiments and as shown herein FIGS. 1A-1B, a system for implementing video searches includes a client (102) and a server (104). In one embodiment, a user sends multimodal search data (112) including text, a picture, and/or a video for a target video to the server (104), the multimodal search data input via a video search box (106) provided at the client (102). After receiving (120) the multimodal search data, the server (104) analyzes the multimodal search data via a data analysis module (122) to obtain an analysis result used for searching an index. Next, the server (104) uses the analysis result to search for the target video via a heterogeneous index formed via a pre-constructed inverted index (124) and vector index (126), generates (128) and returns the target video (114) to the client (102) for displaying to the user on a page at the client.

Now referring to FIG. 2A, in some embodiments and as shown herein, the method for video searches includes the following steps.

Step 202: receive a search request input by a user to search for a target video, the search request including multimodal search data for the target video.

According to various embodiments, the target video includes but is not limited to self-produced media content such as short videos, television series, news programs, and the like, in any format. The search request for the target video can be provided by the user in any suitable manner, without limitation. In one example, the search request is input by the user via a video search interface on a personal computer (PC) or mobile device that enables the user to generate such a search request in any manner. For example, after the user inputs the multimodal search data on the video search interface of the PC or mobile device, the user clicks a search button (e.g., search button 108 of FIG. 1) to generate the search request. In another example, the user enters the multimodal search data by voice command via the video search interface of the PC or mobile device to generate the search request.

In some embodiments, the multimodal search data includes, but is not limited to, search data having one or more data types such as text, image, and video.

In some embodiments, receiving a search request input by the user to search for a target video is implemented by receiving a search request input by the user that includes multimodal search data for the target video, wherein the multimodal search data includes a piece of text, an image, and/or a video.

Step 204: obtain a processing result of the multimodal search data based on the multimodal search data.

According to various embodiments, for different forms of the multimodal search data, the processing of the multimodal search data differs.

In some embodiments, when the modality of the multimodal search data is text (i.e., the multimodal search data is text data), obtaining a processing result of the multimodal search data based on the multimodal search data includes processing the text data based on a pre-configured text algorithm to obtain a semantic text label of the text data.

The preset-configured text algorithm can include any algorithm suitable for processing the text data to obtain the semantic meaning of the text data and setting the semantic text label for the text data based on the semantic meaning of the text data. In one example, the pre-configured text algorithm includes a Natural Language Processing (NLP) algorithm. In some embodiments, the text data is processed by the NLP algorithm to obtain the semantic meaning of the text data, and an appropriate semantic text label is set for the text data based on the semantic meaning of the text data.

In one example, for text data of "Celebrity A is drinking coffee in the office," the text data is processed by a pre-configured text algorithm to obtain the semantic meaning of the text data as the intent is to obtain a target video that contains one or more scenes of "Celebrity is drinking coffee in the office." In this case, semantic text labels set for the text data based on the semantic meaning of the text data is: celebrity A+drinking coffee+office.

In some embodiments, when the modality of the multimodal search data is an image (i.e., the multimodal search data is image data), obtaining a processing result of the multimodal search data based on the multimodal search data includes processing the image data based on a pre-configured image algorithm to obtain a semantic image label of the image data and processing the image data based on a pre-configured vectorization model to obtain a vectorized description of the image data.

The pre-configured image algorithm can include any algorithm suitable for processing the image data and setting a semantic image label for the image data based on the processing result. In one example, the pre-configured image algorithm includes a pre-trained image recognition model. In some embodiments, faces, actions, scenes, and the like, in the image data can be recognized by inputting the image data into the image recognition model.

In one example, for image content of the image data that features "C is playing basketball on the playground," after the image data is processed by the image recognition model, the image content in the image data is recognized as the following: person: C, action: playing basketball, and scene: playground. In this case, semantic image labels set for the image data based on the image content of the image data is: C+playing basketball+playground.

In some embodiments, the pre-configured vectorization model is a machine learning (ML) model that processes input image data to obtain a vectorized description of the image data, which can also be understood as a vectorized representation of the image data, in which a feature of an image is represented by a point in a multi-dimensional vector space.

Therefore, in some embodiments, when the multimodal search data is image data, the processing result of the multimodal search data obtained based on the multimodal search data includes the semantic image label of the image data and the vectorized description of the image data.

In some embodiments, the multimodal search data includes a combination of text data and image data. In this case, obtaining a processing result of the multimodal search data based on the multimodal search data includes processing the text data based on the pre-configured text algorithm to obtain a semantic text label of the text data; processing the image data based on the pre-configured image algorithm to obtain a semantic image label of the image data; and processing the image data based on the pre-configured vectorization model to obtain a vectorized description of the image data.

That is, when the multimodal search data is a combination of text data and image data, the processing result of the multimodal search data obtained by processing the multimodal search data based on the pre-configured algorithm includes: the semantic text label of the text data, the semantic image label of the image data, and the vectorized description of the image data.

In some embodiments, given that the multimodal search data includes a combination of text data and image data, extra search information (e.g., text and an image(s)) is provided when searching for the target video, achieving more accuracy in searches for the target video, and obtaining better target video search results.

In some embodiments, the multimodal search data includes video data. When the modality of the multimodal search data is a video (i.e., the multimodal search data is video data), the video data is processed (e.g., split, divided, or otherwise analyzed to separate metadata from content data) first, and next the processed video data is further processed respectively to obtain a processing result of the video data. In some embodiments, before obtaining a processing result of the multimodal search data based on the multimodal search data, the method further includes processing the video data into video metadata and video stream data, and segmenting the video stream data into a sequence of video frames based on a pre-configured segmentation method.

In some embodiments, the video metadata includes, but is not limited to, the release time, author, title, and description information of the video. In some embodiments, the video stream data includes video content.

In some embodiments, after the video data is processed into the video metadata and the video stream data, the video stream data is further segmented into a sequence of video frames based on a pre-configured segmenting method. In some embodiments, the pre-configured segmenting methods are determined based on actual requirements. In one example, such segmenting method is configured to segment the video stream data into one video frame per second. In other examples, segmenting the video stream data into a sequence of video frames is implemented by transforming the video stream data to a sequence of video frames via decoding and sampling.

In some embodiments, after the video data is processed into the video metadata and the video stream data, the video metadata and the video stream data are further processed respectively to obtain the processing result of the video data. In some embodiments, such further processing includes: processing the video metadata based on the text algorithm to obtain a semantic text label of the video metadata; processing video frames in the sequence of video frames based on a pre-configured video algorithm to obtain semantic video labels of the video frames; and processing the video frames based on the vectorization model to obtain vectorized descriptions of the video frames.

In some embodiments, since the video metadata includes text data, the previously described text algorithm is used to process the video metadata to obtain the semantic text label of the video metadata. In this case, the semantic text label of the video metadata includes, but is not limited to, content such as faces, actions, and scenes.

In some embodiments, using the pre-configured video algorithm to process the video frames in the sequence of video frames is implemented by analyzing the image content in the video frames in the sequence of video frames, which is obtained via video decoding and sampling logics, to produce a semantic label of each video frame. The pre-configured video algorithm can be any algorithm suitable for processing the video frames to obtain the semantic video labels of the video frames. In one example, the pre-configured video algorithm is a pre-trained image recognition model. In some embodiments, by inputting a video frame to the image recognition model, content such as a face, an action, a scene, and the like, in the video frame is recognized; and a semantic video label is set for the video frame based on the recognized content of the video frame.

In some embodiments, obtaining the content of video frames and obtaining the content of image data using the image recognition model is different. As image data relates to a single image, when the image recognition model is used to obtain the content of the image data, only image features in the image data itself need to be considered. On the other hand, as the video frames are continuous, when the image recognition model is used to obtain the content of each video frame, it is necessary to consider the semantic meanings of the previous video frame and the subsequent video frame of the video frame to set an appropriate semantic video label for each video frame.

In some embodiments, the pre-configured vectorization model is a machine learning model, configured to process an input video frame to obtain a vectorized description of each video frame. Details that are substantially similar to those of the vectorization model for image data is not repeated.

As such, when the multimodal search data is video data, the processing result of the multimodal search data obtained based on the multimodal search data includes: the semantic text label of the video metadata, the semantic video labels of the video frames, and the vectorized descriptions of the video frames.

In some embodiments, the multimodal search data includes a combination of text data and video data. In this case, the obtaining of a processing result of the multimodal search data based on the multimodal search data specifically includes: processing the text data based on the pre-configured text algorithm to obtain a semantic text label of the text data; processing the video metadata based on the text algorithm to obtain a semantic text label of the video metadata; processing video frames in the sequence of video frames based on a pre-configured video algorithm to obtain semantic video labels of the video frames; and processing the video frames based on the vectorization model to obtain vectorized descriptions of the video frames.

That is, when the multimodal search data includes a combination of text data and video data, the processing result of the multimodal search data obtained by processing the multimodal search data based on the pre-configured algorithm includes: the semantic text label of the text data, the semantic text label of the video metadata, the semantic video labels of the video frames, and the vectorized descriptions of the video frames.

In some embodiments, given that the multimodal search data includes a combination of text data and image data, extra search information (e.g., text and an image(s)) is provided when searching for the target video, achieving more accuracy in searches for the target video, and obtaining better target video search results.

Still referring to FIG. 2A, at step 206: the method provides the processing result of the multimodal search data with regard to a corresponding pre-constructed index to perform a search to obtain the target video.

In some embodiments, when the multimodal search data is text data, providing the processing result of the multimodal search data with regard to a corresponding pre-constructed index to search to obtain the target video includes: providing the semantic text label of the text data with regard to a corresponding pre-constructed inverted index to search to obtain the target video.

In some embodiments, before providing the semantic text label of the text data with regard to a corresponding pre-constructed inverted index to search to obtain the target video, intent analysis is performed on the semantic text label of the text data, the result of which is provided with regard to the corresponding pre-constructed inverted index to search to obtain the target video.

In some embodiments, when the multimodal search data is image data, providing the processing result of the multimodal search data with regard to a corresponding pre-constructed index to search to obtain the target video includes: providing the semantic image label with regard to a corresponding pre-constructed inverted index to search to obtain a first initial video; providing the vectorized description of the image data with regard to a corresponding pre-constructed vector index to search to obtain a second initial video; and obtaining the target video based on the first initial video and the second initial video.

In some embodiments, the index is constructed by: obtaining video data, and processing the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; constructing an inverted index based on the text processing result and the video processing result, and constructing a vector index based on the vectorization processing result.

In some embodiment, while the video stream data is processed based on the vectorization model to obtain the vectorization processing result of the video stream data, a vectorization processing result of the audio data in the video is also obtained, such that a search for the target video can be performed subsequently based on the audio data.

In some embodiments, the inverted index and the vector index constitute a heterogeneous search engine, the details of which are described with connection to embodiments for specific construction of the heterogeneous search engine, below. In some embodiments, the target video is obtained by performing a search using the heterogeneous search engine. That is, the first initial video is obtained via the inverted index, the second initial video is obtained via the vector index, and the target video is obtained based on the first initial video and the second initial video.

In some embodiments, before providing the semantic image label with regard to a corresponding pre-constructed inverted index to search to obtain a first initial video, intent analysis is performed on the semantic image label, the result of which is in turn provided with regard to the corresponding pre-constructed inverted index to search to obtain the first initial video.

In some embodiments, when the multimodal search data includes text data and image data, providing the processing result of the multimodal search data with regard to a corresponding pre-constructed index to search to obtain the target video includes: combining the semantic image label and the semantic text label of the text data, providing the combined labels with regard to the corresponding pre-constructed inverted index to a search to obtain the first initial video; providing the vectorized description of the image data with regard to a corresponding pre-constructed vector index to search to obtain the second initial video; and obtaining the target video based on the first initial video and the second initial video.

In some embodiments, the first initial video includes the top N number of videos having relatively high similarities to the target video, N being a positive integer. Here, the top N number of videos are obtained by: performing intent analysis after combining the semantic image label and the semantic text label of the text data, and providing the intent analysis processing result with regard to the corresponding pre-constructed inverted index to perform a search.

In some embodiments, the second initial video includes the top M number of videos having relatively high similarities to the target video, M being a positive integer. Here, the top M number of videos are obtained by providing the vectorized description of the image data with regard to the corresponding pre-constructed vector index to perform a search.

In some embodiments, after the first initial video and the second initial video are obtained, obtaining the target video based on the first initial video and the second initial video includes: comparing the first initial video and the second initial video to remove duplicated videos; recalculating the first initial video and second initial video, without the duplicates, to obtain target scores of the first initial video and second initial video without the duplicates; and sorting the first initial video and second initial video without the duplicates, based on the target scores to obtain the target video.

In one example, the first initial video includes video A, video B, and video C; and the second initial video includes video A, video D, and video E. Here, obtaining the target video based on the first initial video and the second initial video includes: comparing the first initial video and the second initial video to remove duplicated videos to obtain video A, video B, video C, video D, and video E; recalculating video A, video B, video C, video D, and video E without the duplicates to obtain target scores of video A, video B, video C, video D, and video E. In this example, the target score of video A is 80%, the target score of video B is 90%, the target score of video C is 87%, the target score of video D is 96%, and the target score of video E is 79%. Next, after ranking the videos based on the respective target scores of video A, video B, video C, video D, and video E, the ranked video D, video B, video C, video A, and video E is designated as the target videos. In some embodiments, it is also determined that video D has the highest target score, and therefore video D alone is used as the target video.

In some embodiments, when the multimodal search data includes video data, providing the processing result of the multimodal search data with regard to a corresponding pre-constructed index to search to obtain the target video includes: providing the semantic text label of the video metadata with regard to a corresponding pre-constructed inverted index to search to obtain a third initial video; providing the vectorized descriptions of the video frames with regard to a corresponding pre-constructed vector index to search to obtain a fourth initial video; and obtaining the target video based on the third initial video and the fourth initial video.

In some embodiments, the inverted index and the vector index constitute a heterogeneous search engine. The third initial video is obtained via the inverted index, the fourth initial video is obtained via the vector index at the same time, and next, the target video is obtained based on the third initial video and the fourth initial video.

In some embodiments, before the providing the semantic text label of the video metadata with regard to a corresponding pre-constructed inverted index to search to obtain a third initial video, intent analysis is performed on the semantic text label of the video metadata. Next, the analysis result of the semantic text label of the video metadata after the intent analysis is provided with regard to the corresponding pre-constructed inverted index to search to obtain the third initial video.

In some embodiments, when the multimodal search data includes text data and video data, providing the processing result of the multimodal search data with regard to a corresponding pre-constructed index to search to obtain the target video includes: combining the semantic text label of the video metadata and the semantic text label of the text data, and providing the combined labels with regard to the corresponding pre-constructed inverted index to search to obtain the third initial video; providing the vectorized descriptions of the video frames with regard to the corresponding pre-constructed vector index to search to obtain the fourth initial video; and obtaining the target video based on the third initial video and the fourth initial video.

Here, providing the vectorized descriptions of the video frames with regard to the corresponding pre-constructed vector index to search to obtain the fourth initial video is illustrated in the following example.

First, the video stream data is segmented into two video frames (e.g., frame 1 and frame 2). Next, a vectorized description of video frame 1 is provided with regard to the corresponding pre-constructed vector index to retrieve 10 video frames having relatively high similarities to video frame 1. Further, a vectorized description of video frame 2 is provided with regard to the corresponding pre-constructed vector index to retrieve 10 video frames having relatively high similarities to video frame 2. In turn, it is determined that these 20 video frames are sourced from 15 videos based on these 20 video frames (e.g., due to the existence of duplicates). In this case, the 15 videos are ranked based on the confidences of the 15 videos, which are obtained based on video frame 1 and video frame 2. For instance, among the 15 videos, video(s) including both video frame 1 and video frame 2 in a continuous manner, is set as having relatively higher confidence. On the other hand, video(s) among the 15 videos including only video frame 1 or video frame 2 is set as having relatively lower confidence. In this example, the 15 ranked videos are the fourth initial videos.

In some embodiments, the third initial video includes the top E number of videos having relatively high similarities to the target video, E being a positive integer. Here, the top E number of videos are obtained by: performing intent analysis after combining the semantic text label of the video metadata and the semantic text label of the text data, and providing the intent analysis processing result with regard to the corresponding pre-constructed inverted index to perform a search.

In some embodiments, the fourth initial video includes the top F number of videos having relatively high similarities to the target video, F being a positive integer. Here, the top F number of videos are obtained by providing the vectorized descriptions of the video frames with regard to the corresponding pre-constructed vector index to perform a search.

In some embodiments, after the third initial video and the fourth initial video are obtained, obtaining the target video based on the third initial video and the fourth initial video includes: comparing the third initial video and the fourth initial video to remove duplicated videos; recalculating the third initial video and fourth initial video, without the duplicates, to obtain target scores of the third initial video and fourth initial video without the duplicates; and ranking the third initial video and fourth initial video, without the duplicates, based on the target scores to obtain the target video.

In some embodiments, details of obtaining the target video based on the third initial video and the fourth initial video that are substantially similar to those relating to obtaining the target video based on the first initial video and the second initial video as above-described, are not repeated.

According to various embodiments of the disclosure, based on video interpretation technologies and a heterogeneous search engine, video searches are empowered with expanded modalities in terms of search engine queries. This way, when a search for a target video is performed, text data, as well as image data and video data, is input to retrieve the target video, achieving searching effects of obtaining a larger number of and more accurate target videos.

Figure 3:
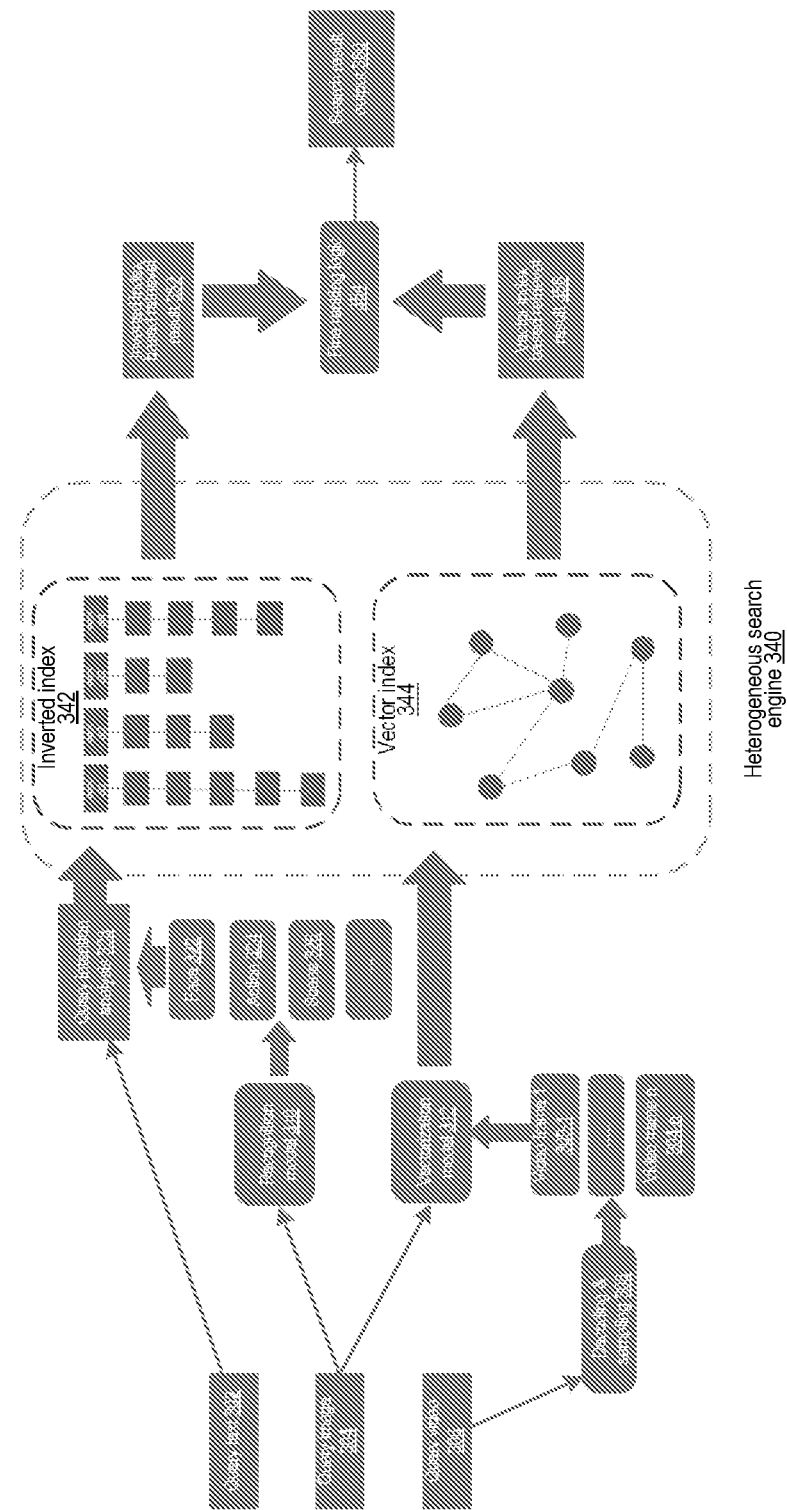
FIG. 3 is a schematic diagram illustrating a flow of video searches according to some embodiments of the disclosure.

FIG. 3 is a flow diagram illustrating a method for video searches according to embodiments of the disclosure.

Retrieval logic 1: When the multimodal search data included in an input search request includes text data (302), the text content of the text data is analyzed via natural language processing to generate a semantic text label. In turn, the semantic text label is processed by a query intent analysis module (328), the result of which is used to query with regard to an inverted index (342) to produce an inverted index based retrieval result (352).

Retrieval logic 2: when the multimodal search data included in an input search request includes image data (304), the image content of the image data is analyzed first via an image recognition model (310) to generate a semantic image label (e.g., label indicating faces 322, labels indicating action 324, and label indicating scene 326). In turn, the semantic image label is processed by a query intent analysis module (328), the result of which is used to query with regard to an inverted index (342) to produce an inverted index based retrieval result (352).

Retrieval logic 3: when multimodal search data included in an input search request includes text data and image data, the text content of the text data is first analyzed via natural language processing to generate a semantic text label; and then the image content of the image data is analyzed via an image recognition model (310) to generate a semantic image label. After the semantic text label and the semantic image label are combined, the combined labels are processed by a query intent analysis module (328), the result of which is used to query with regard to obtain an inverted index (342) to produce an inverted index based retrieval result (352).

Retrieval logic 4: when multimodal search data included in an input search request includes video data (306), the video data is first processed into video metadata (e.g., the processing of the video metadata illustrated with connection to FIG. 2A) and video stream data. Next, the video stream data is transformed to a sequence of video frames 309-1, . . . , 309-n via decoding and sampling logics (308) for the video stream data. The image content of each video frame is analyzed to generate a semantic video label, and the semantic video labels are processed by a query intent analysis module (328), the result of which is used to query with regard to an inverted index (324) to produce an inverted index based retrieval result (352). At the same time, the video frames in the sequence of video frames are vectorized via a vectorization model (312). In turn, a vector index based retrieval result (356) is produced based on vector searches (344) and timing checks. In some embodiments, the timing checks refer to the sequence of the video frames in the vector index based retrieval result.

Retrieval logic 5: when the multimodal search data included in an input search request includes text data and video data, the text content of the text data is analyzed via natural language processing to generate a semantic text label. Next, the video data is processed into video metadata (e.g., the processing of the video metadata as illustrated with connection to FIG. 2) and video stream data. The video metadata is analyzed for text content via natural language processing to generate a semantic text label. The video stream data is transformed to a sequence of video frames via decoding and sampling logics for the video stream data; and each video frame is analyzed for image content to generate a semantic video label. In turn, the semantic text label and semantic video labels are combined and processed by a query intent analysis module, the result of which is used to query with regard to an inverted index to produce an inverted index based retrieval result. At the same time, the video frames in the sequence of video frames are vectorized via a vectorization model, and a vector index based retrieval result is produced based on vector searches (344) and timing checks. In some embodiments, the timing checks refer to the sequence of the video frames in the vector index based retrieval result.

Lastly, the inverted index based retrieval result (352) and the vectorization index based retrieval result (356) are rearranged by fine ranking logic (354) to output a search result for a target video (360).

In some embodiments, when the pre-constructed heterogeneous index (340) enables audio searches, the video search method also performs a search for the target video based on audio data, without any limitation.

According to various embodiments of the disclosure, the video search method supports multimodal search requests to include not only individual inputs of three modalities of text data, image data, and video data also composite input of text data and image data, and composite input of text data and video data. This way, better target video search effects are achieved, greatly satisfying the needs of users for obtaining more accurate target videos via a heterogeneous search engine based on multimodal search data, thereby improving user experiences.

Figure 2B:
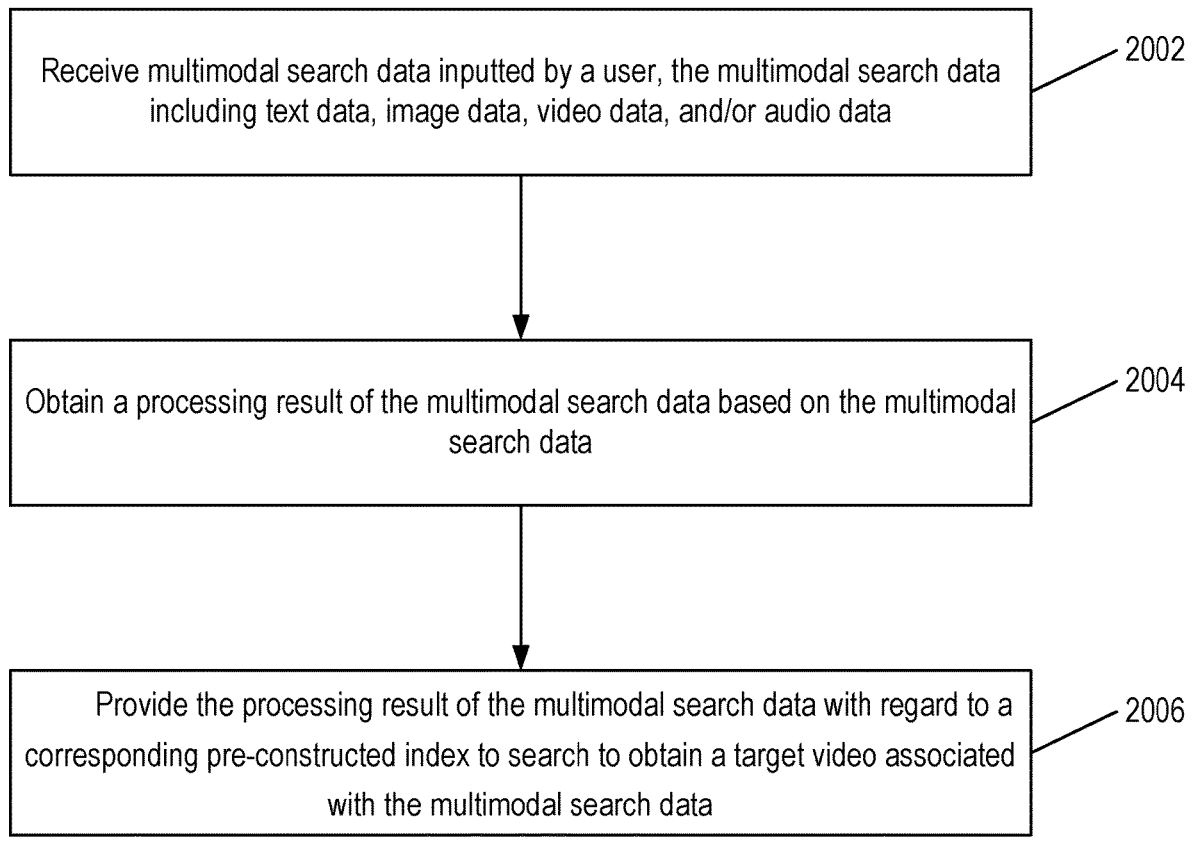
FIG. 2B is a flow diagram illustrating a method for video searches according to some embodiments of the disclosure.

FIG. 2B is a flow diagram illustrating a method for video searches according to some embodiments of the disclosure. In some embodiments and as shown herein, the method includes the following steps.

Step 2002: receive multimodal search data input by a user, the multimodal search data including text data, image data, video data, and/or audio data.

In some embodiments, the multimodal search data includes any one of text data, image data, video data, or audio data, or a combination of any two, three, or four of text data, image data, video data, and audio data.

Step 2004: obtain a processing result of the multimodal search data based on the multimodal search data.

In some embodiments, obtaining a processing result of the multimodal search data based on the multimodal search data includes: processing the multimodal search data based on a pre-configured algorithm to obtain a data label of the multimodal search data.

Correspondingly, providing the processing result of the multimodal search data with regard to a corresponding pre-constructed index to search to obtain a target video associated with the multimodal search data includes: providing the data label of the multimodal search data with regard to the corresponding pre-constructed index to search to obtain the target video associated with the multimodal search data.

In some embodiments, details of processing the multimodal search data based on a pre-configured algorithm to obtain a data label of the multimodal search data that are substantially similar to those illustrated above in connection with embodiments of processing the multimodal search data based on the pre-configured text algorithm, image algorithm, and video algorithm, and the like, to obtain a semantic text label, a semantic image label, and a semantic video label, is not repeated herein.

In case of audio data, in some embodiments, the audio data is converted to text data first and then processed based on the processing manner of text data. In other embodiments, features of the audio data is extracted based on sound waves and/or voice prints (or the like) in the audio to add a semantic audio label to the audio data, which is subsequently used to perform a search with regard to the pre-constructed index.

Step 2006: provide the processing result of the multimodal search data with regard to a corresponding pre-constructed index to search to obtain a target video associated with the multimodal search data.

In some embodiments, the index is constructed by: obtaining video data, and processing the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; constructing an inverted index based on the text processing result and the video processing result, and constructing a vector index based on the vectorization processing result.

Further, when the video stream data is processed based on the vectorization model, while the vectorization processing result of the video stream data is obtained, a vectorization processing result of audio data in the video can also be obtained such that a search for the target video can be performed subsequently based on the audio data.

In some embodiments, the data label of the multimodal search data is input with regard to a corresponding heterogeneous index that supports text, image, video, and audio searches (e.g., the inverted index and the vector index constitute the heterogeneous index), and a search is performed to obtain the target video associated with the modal search data.

In some embodiments, the target video includes one or more videos having relatively high similarities in regard with the multimodal data. In one example, the multimodal search data includes: text data of that the leading actor a in a TV series; and audio data of the voice of leading actor a. As such, the multimodal search data is input with regard to the corresponding pre-constructed heterogeneous index to obtain the search result of one or more target videos, associated with the multimodal search data, featuring leading actor a.

Further, when the input text data does not indicate a clear search target, further semantic analysis is performed on the text data, and a secondary retrieval is performed based on the analyzed semantic text content. This way, the target video associated with the input text data is obtained by performing a search with regard to the heterogeneous index. For example, the user inputs the plot of an episode of a TV series. In this example, a corresponding title of the TV series is first retrieved based on the input plot via a primary indexing. Next, a secondary retrieval is performed based on the retrieved TV series title to obtain one or more target videos associated with the episode of the TV series.

According to various embodiments of the disclosure, in video searches, multimodal search data input by a user is used to obtain one or more target videos associated with the multimodal search data based on a pre-constructed heterogeneous index. This way, a batch of associated videos is obtained via searches such that the user can obtain one or more associated videos having relatively high similarities to the multimodal search data. As such, accurate results are obtained for fuzzy searches, enhancing user experiences.

Figure 4:
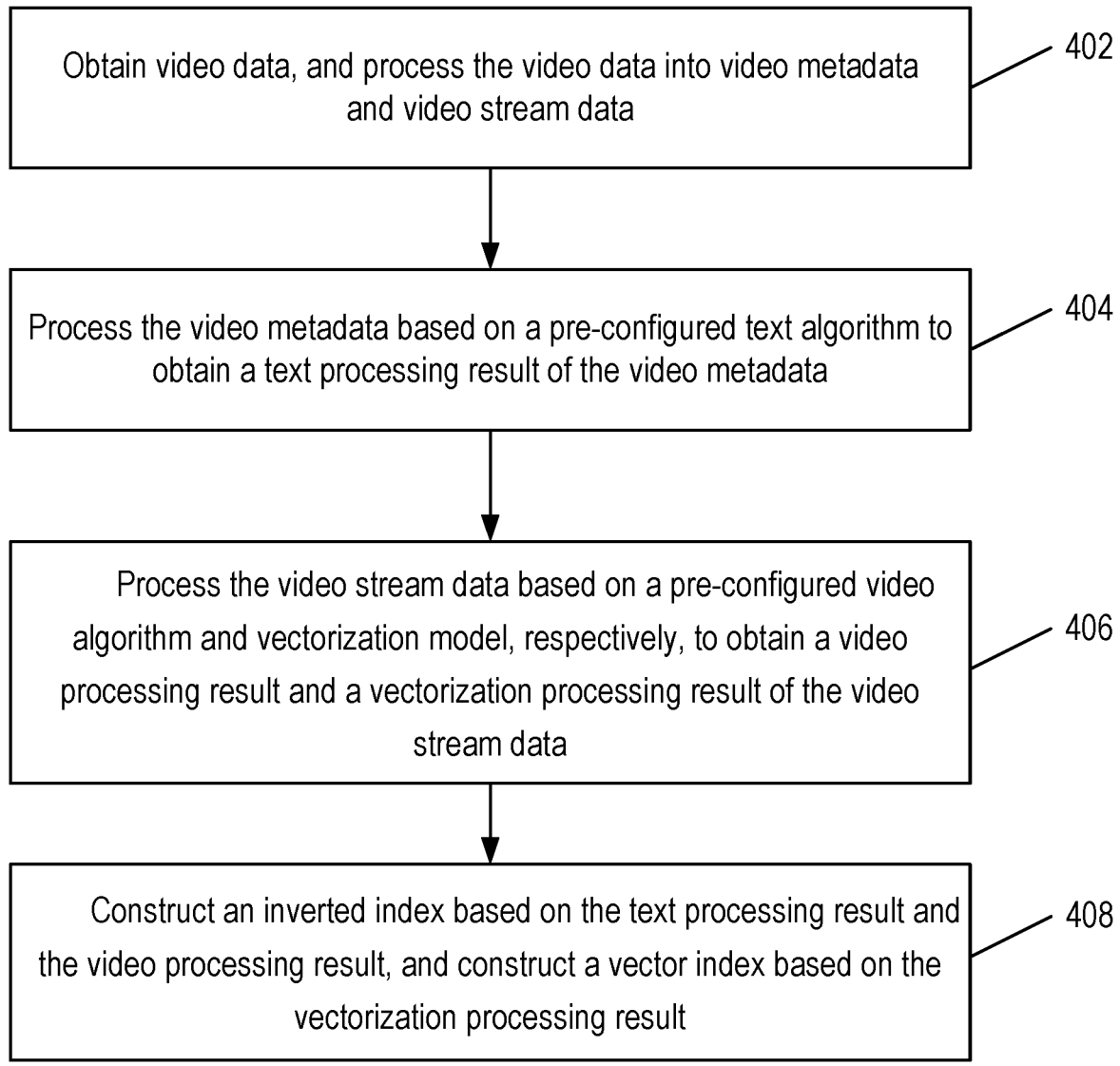
FIG. 4 is a flow diagram illustrating a method for index construction according to some embodiments of the disclosure.
Figure 5:
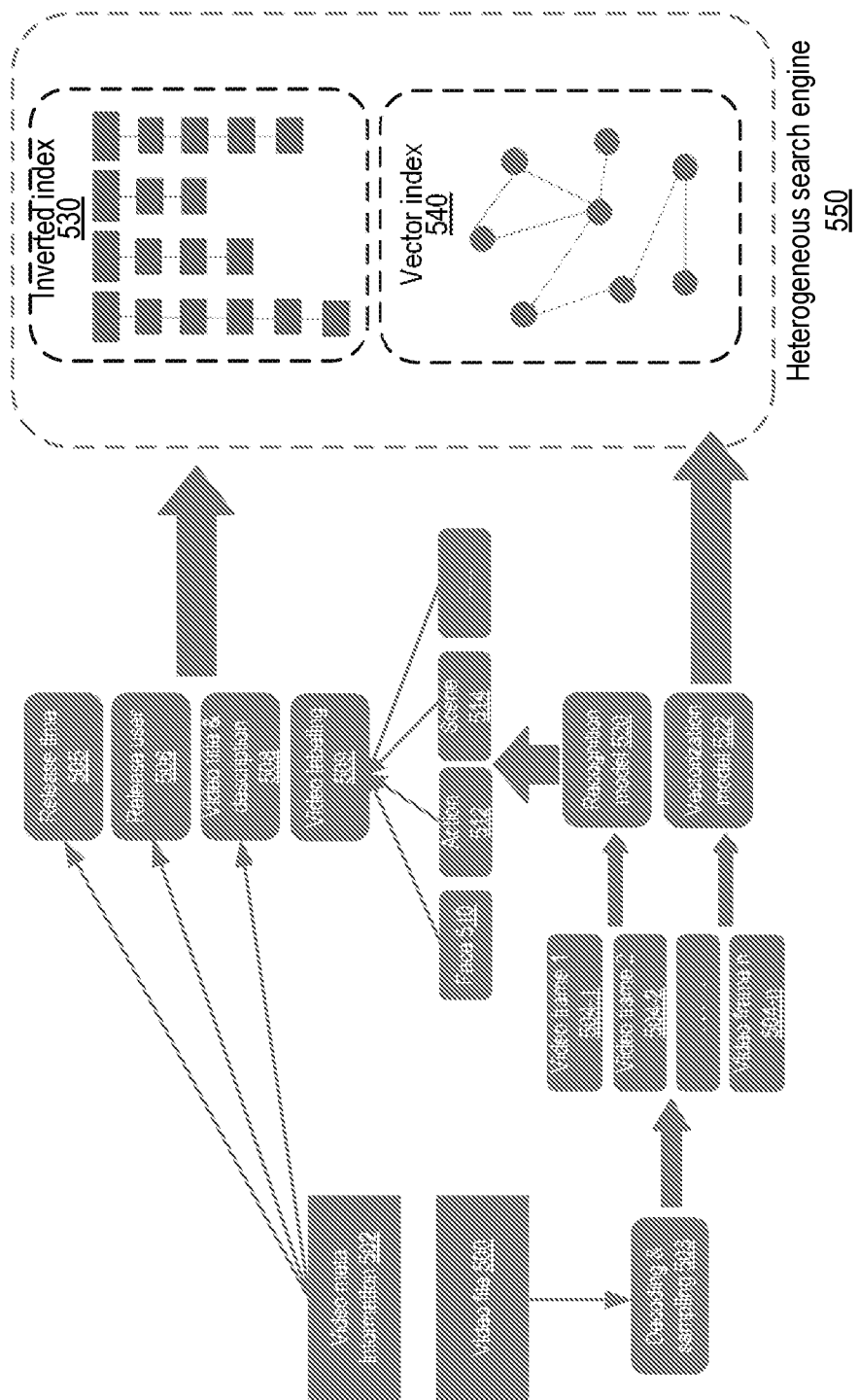
FIG. 5 is a flow diagram illustrating a method for index construction according to some embodiments of the disclosure.

FIG. 4 is a flow diagram illustrating a method for n index construction according to some embodiments of the disclosure. FIG. 5 is a schematic diagram illustrating video searches according to some embodiments of the disclosure. The following illustrates the method of FIG. 4 with reference to FIG. 5. In some embodiments and as shown herein, the method includes the following steps.

Step 402: obtain video data, and process the video data into video metadata and video stream data.

In some embodiments, the video data includes, but is not limited to, self-published media such as short videos, TV series, news programs, and the like, in any format.

As shown in FIG. 5, the video data (e.g., video file (500)) is processed into video metadata (502) and video stream data. The video metadata (502) includes, but is not limited to, the release time (505), release user (506), video title and description of the video (508), and the like. Here, the video stream data include video content.

Step 404: process the video metadata based on a pre-configured text algorithm to obtain a text processing result of the video metadata.

In some embodiments, processing the video metadata based on a pre-configured text algorithm to obtain a text processing result of the video metadata includes: processing the video metadata based on the pre-configured text algorithm to obtain a semantic text label of the video metadata.

In some embodiments, details for processing the video metadata based on the pre-configured text algorithm to obtain the text processing result of the video metadata that are substantially similar to those described above are not repeated herein.

Referring now to FIG. 5, as shown herein, semantic text labels including text semantic labels indicating contents such as human faces (510), actions (512), and scenes (514), and the like, based on the intent of the video metadata.

Step 406: process the video stream data based on a pre-configured video algorithm and vectorization model, respectively, to obtain a video processing result and a vectorization processing result of the video stream data.

In some embodiments, before processing the video metadata based on the pre-configured text algorithm to obtain a semantic text label of the video metadata, the method further includes: segmenting the video stream data into a sequence of video frames based on a pre-configured segmenting manner.

As shown in FIG. 5, the video stream data is decoded and sampled (503), and transformed to video frame 1 (504-1), video frame 2 (504-2), . . . , and video frame n (504-n).

Details of segmenting the video stream data into the sequence of video frames based on the pre-configured segmenting manner that are substantially similar to those above described with connection to embodiments of segmenting a video stream data into a sequence of video frames are not repeated herein.

Further, after the video stream data is segmented into the sequence of video frames, processing the video stream data based on a pre-configured video algorithm and vectorization model, respectively, to obtain a video processing result and a vectorization processing result of the video stream data includes: processing video frames in the sequence of video frames based on a pre-configured video algorithm to obtain semantic video labels of the video frames; and processing the video frames based on the pre-configured vectorization model to obtain vectorized descriptions of the video frames.

Details of processing based on the pre-configured video algorithm and the pre-configured vectorization model on the video frames that are substantially similar to those above described with connection to embodiments of video searches are not repeated herein. In some embodiments and as shown in FIG. 5, when the pre-configured video algorithm is a pre-trained image recognition model (520), video frame 1 to video frame n are respectively processed by the image recognition model (520) to obtain an intent of each video frame of video frame 1 through video frame n. Here, based on the intent of each video frame and semantic meanings of the respective previous video frame and the respective subsequent video frame, semantic video labels (509) indicating content such as faces (510), actions (512), scenes (514), etc. are set for each video frame of video frame 1 through video frame n. Further, each video frame from video frame 1 to video frame n is processed by the vectorization model (522) to obtain a vectorized representation of each video frame from video frame 1 to video frame n.

Step 408: construct an inverted index based on the text processing result and the video processing result, and construct a vector index based on the vectorization processing result.

In some embodiments, after the processing results of the video metadata and the video stream data are obtained, the indexes are constructed based on the processing results.

In some embodiments, constructing an inverted index based on the text processing result and the video processing result, and constructing a vector index according to the vectorization processing result includes: constructing the inverted index based on the semantic text label and the semantic video labels, and constructing the vector index based on the vectorized descriptions.

In some embodiments, and as shown in FIG. 5, the semantic text label of the video metadata and the semantic video label of each video frame of video frame 1 through video frame n are placed into the inverted index (530) to construct the inverted index. In some embodiments, the constructed inverted index is used for text search. The vectorized description of each video frame of video frame 1 through video frame n is placed into the vector index to construct the vectorization index (540). In some embodiments, the constructed vector index is used to search for video frames and image features. The constructed inverted index and vector index form a heterogeneous search engine such that, when used for retrieval subsequently, not only does the search engine perform a retrieval based on text data, but also perform a retrieval based on image and video data.

According to various embodiments of the disclosure, in index construction, each piece of video data entered into an index library is processed into video metadata and video stream data. As such, the video metadata is processed by a natural language algorithm and placed into an inverted index; and the video stream data is transformed to video frames via decoding and sampling such that the video frames are processed by a video interpretation algorithm to obtain label information (e.g., faces, scenes, actions, etc.) for the video frames. Afterwards, this part of semantic label information is also placed into the inverted index to construct the inverted index. Further, after the video frames are processed by a vectorization model, the obtained vectorized descriptions of the video frames are placed into a vector index such that, subsequently, the vector index is used for vectorized search of video content, to construct the vector index. Lastly, a heterogeneous search engine is formed based on the constructed inverted index and vector index such that in a multimodal video search system, in addition to text, a user can also input an image or video in the heterogeneous search engine to achieve more accurate retrieval of a target video.

Figure 6A:
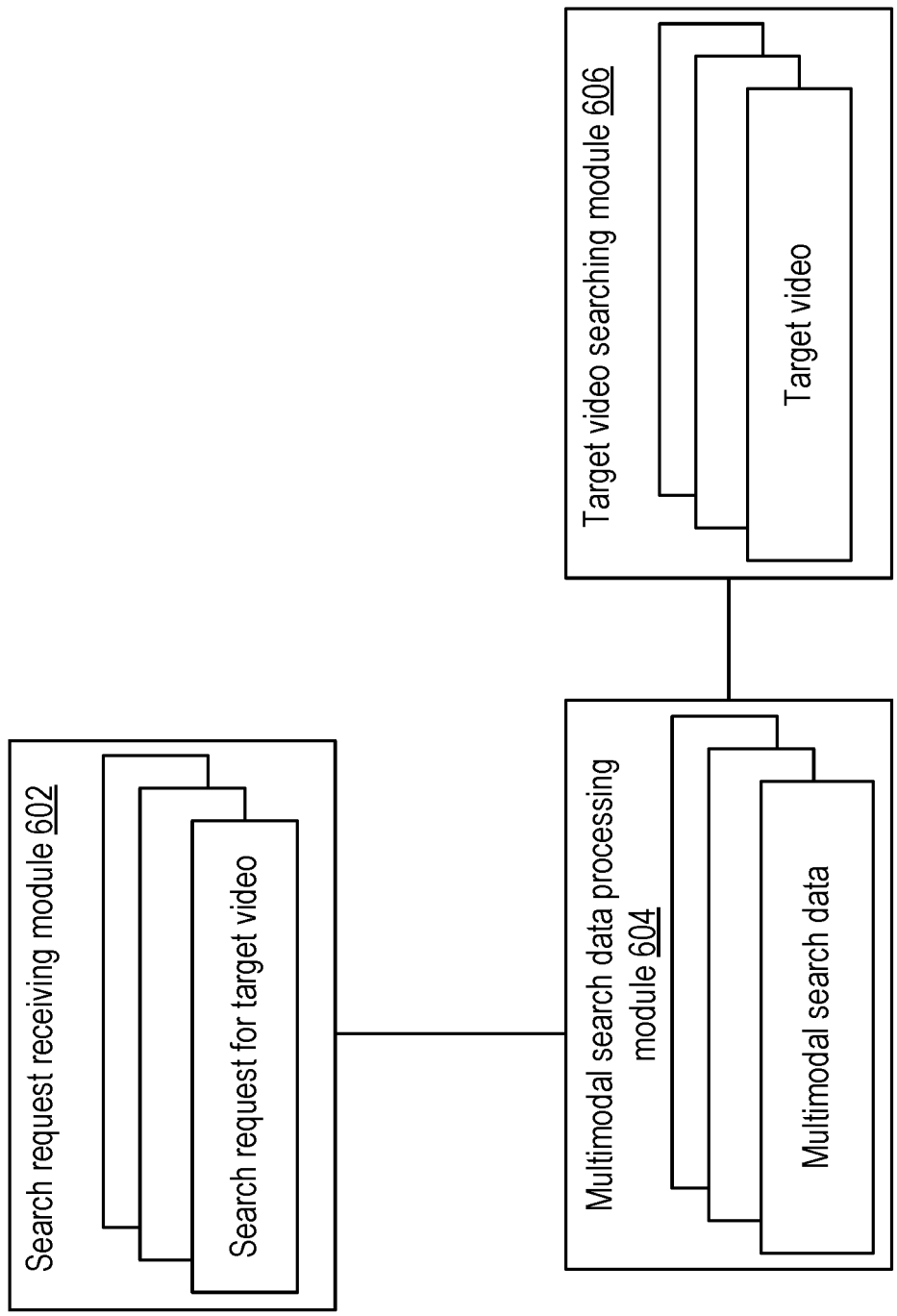
FIG. 6A is a block diagram illustrating an apparatus for video searches according to some embodiments of the disclosure.

FIG. 6A is a block diagram illustrating an apparatus for video searches according to some embodiments of the disclosure. In some embodiments and as shown in FIG. 6A, the apparatus includes: a search request receiving module (602), a multimodal search data processing module (604), and a target video searching module (606).

The search request receiving module (602) is configured to receive a search request input by a user to search for a target video, the search request including multimodal search data for the target video.

The multimodal search data processing module (604) is configured to process the multimodal search data based on a pre-configured algorithm to obtain a processing result of the multimodal search data.

The target video searching module (606) is configured to provide the processing result of the multimodal search data with regard to a corresponding pre-constructed index to search to obtain the target video.

In some embodiments, the multimodal search data includes text data.

In this case, the multimodal search data processing module (604) is further configured to: process the text data based on a pre-configured text algorithm to obtain a semantic text label of the text data.

In some embodiments, the multimodal search data includes image data.

In this case, the multimodal search data processing module (604) is further configured to process the image data based on a pre-configured image algorithm to obtain a semantic image label of the image data; and process the image data based on a pre-configured vectorization model to obtain a vectorized description of the image data.

In some embodiments, the multimodal search data includes video data.

In this case, the apparatus further includes a division module configured to process the video data into video metadata and video stream data, and segment the video stream data into a sequence of video frames based on a pre-configured division manner.

In some embodiments, the multimodal search data processing module (604) is further configured to: process the video metadata based on the text algorithm to obtain a semantic text label of the video metadata; process video frames in the sequence of video frames based on a pre-configured video algorithm to obtain semantic video labels of the video frames; and process the video frames based on the vectorization model to obtain vectorized descriptions of the video frames.

In some embodiments, the target video searching module (606) is further configured to provide the semantic text label of the text data with regard to a corresponding pre-constructed inverted index to search to obtain the target video.

In some embodiments, the target video searching module (606) is further configured to: provide the semantic image label with regard to a corresponding pre-constructed inverted index to search to obtain a first initial video; provide the vectorized description of the image data with regard to a corresponding pre-constructed vector index to search to obtain a second initial video; and obtain the target video based on the first initial video and the second initial video.

In some embodiments, the target video searching module (606) is further configured to: provide the semantic text label of the video metadata with regard to a corresponding pre-constructed inverted index to search to obtain a third initial video; provide the vectorized descriptions of the video frames with regard to a corresponding pre-constructed vector index to search to obtain a fourth initial video; and obtain the target video based on the third initial video and the fourth initial video.

In some embodiments, the target video searching module (606) further includes a first combining submodule configured to: combine the semantic image label and the semantic text label of the text data; provide the combined labels with regard to the corresponding pre-constructed inverted index; and perform a search to obtain the first initial video.

In some embodiments, the target video searching module (606) further includes a second combining submodule configured to: combine the semantic text label of the video metadata, the semantic text label of the text data, and the semantic video labels of the video frames; provide the combined labels with regard to the corresponding pre-constructed inverted index; and perform a search to obtain the third initial video.

In some embodiments, the target video searching module (606) is further configured to: compare the first initial video and the second initial video to remove duplicated videos; recalculate the first initial video and second initial video, without the duplicate, to obtain target scores of the first initial video and second initial video, without the duplicate; and rank the first initial video and second initial video, without the duplicate, based on the target scores to obtain the target video.

In some embodiments, the target video searching module (606) is further configured to: compare the third initial video and the fourth initial video to remove duplicated videos; recalculate the third initial video and fourth initial video, without the duplicates, to obtain target scores of the third initial video and fourth initial video, without the duplicates; and rank the deduplicated third initial video and fourth initial video, without the duplicates, based on the target scores to obtain the target video.

In some embodiments, the index is constructed by: obtaining video data, and processing the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; constructing an inverted index based on the text processing result and the video processing result, and constructing a vector index based on the vectorization processing result.

Details of the video search apparatus that are substantially similar to the above-described embodiments of video searches are note repeated herein.

Figure 6B:
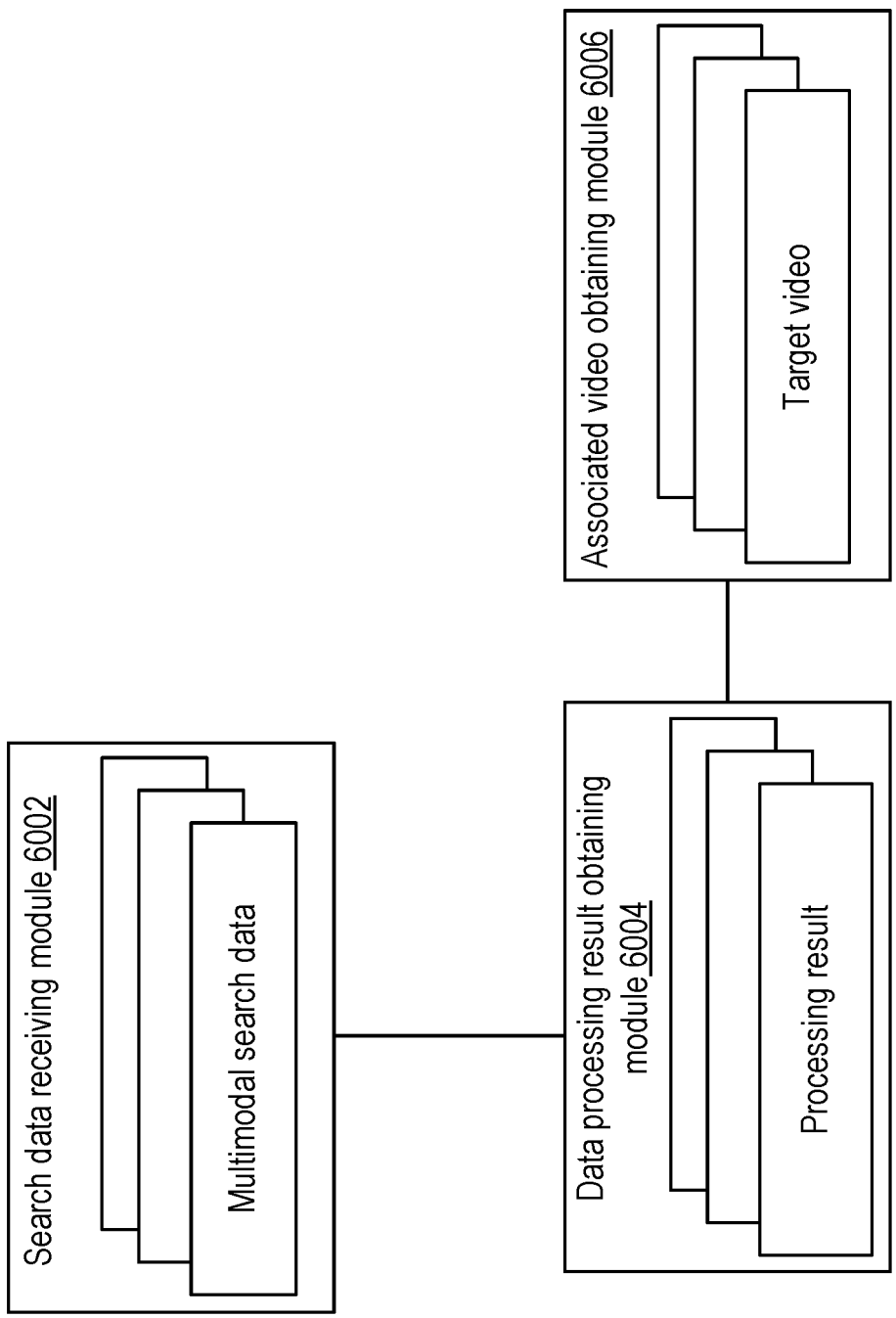
FIG. 6B is a block diagram illustrating an apparatus for video searches according to some embodiments of the disclosure.

FIG. 6B is a block diagram illustrating an apparatus for a video searches according to some embodiments of the disclosure. In some embodiments and as shown in FIG. 6B, the apparatus includes: a search data receiving module (6002), a data processing result obtaining module (6004), and an associated video obtaining module (6006).

The search data receiving module (6002) is configured to receive multimodal search data input by a user, the multimodal search data including text data, image data, video data, and/or audio data.

The data processing result obtaining module (6004) is configured to obtain a processing result of the multimodal search data based on the multimodal search data.

The associated video obtaining module (6006) is configured to provide the processing result of the multimodal search data with regard to a corresponding pre-constructed index to search to obtain a target video associated with the multimodal search data.

In some embodiments, the data processing result obtaining module (6004) is further configured to process the multimodal search data based on a pre-configured algorithm to obtain a data label of the multimodal search data.

Correspondingly, the associated video obtaining module (6006) is further configured to provide the data label of the multimodal search data with regard to the corresponding pre-constructed index to search to obtain the target video associated with the multimodal search data.

In some embodiments, the index is constructed by: obtaining video data, and splitting the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; and constructing an inverted index based on the text processing result and the video processing result, and constructing a vector index based on the vectorization processing result.

Figure 7:
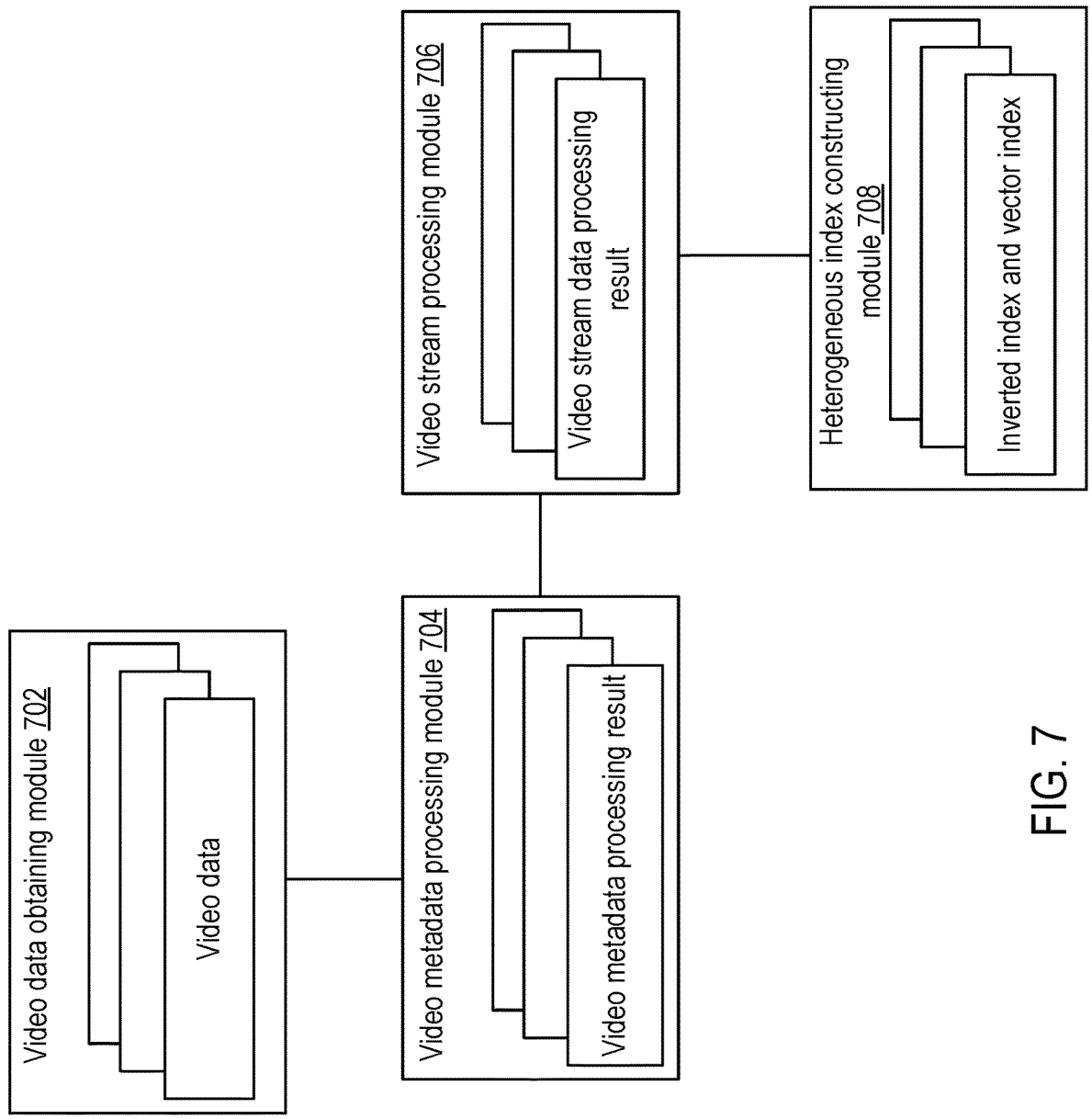
FIG. 7 is a block diagram illustrating an apparatus for index construction according to some embodiments of the disclosure.

Details of the video search apparatus that are substantially similar to the above-described embodiments of video searches are note repeated herein. FIG. 7 is a block diagram illustrating an apparatus for index construction according to some embodiments of the disclosure. In some embodiments and as shown in FIG. 7, the apparatus includes: a video data obtaining module (702), a video metadata processing module (704), a video stream processing module (706), and a heterogeneous index constructing module (708).

The video data obtaining module (702) is configured to obtain video data and process the video data into video metadata and video stream data.

The video metadata processing module (704) is configured to process the video metadata based on a pre-configured text algorithm to obtain a text processing result of the video metadata.

The video stream processing module (706) is configured to process the video stream data based on a pre-configured video algorithm and vectorization model, respectively, to obtain a video processing result and a vectorization processing result of the video stream data.

The heterogeneous index constructing module (708) is configured to construct an inverted index based on the text processing result and the video processing result, and construct a vector index based on the vectorization processing result.

In some embodiments, the video metadata processing module (704) is further configured to process the video metadata based on the pre-configured text algorithm to obtain a semantic text label of the video metadata.

In some embodiments, the apparatus further includes a video dividing module configured to segment the video stream data into a sequence of video frames based on a pre-configured segmenting manner.

In some embodiments, the video stream processing module (706) is further configured to: process video frames in the sequence of video frames based on a pre-configured video algorithm to obtain semantic video labels of the video frames; and process the video frames based on the pre-configured vectorization model to obtain vectorized descriptions of the video frames.

In some embodiments, the heterogeneous index constructing module (708) is further configured to: construct the inverted index based on the semantic text label and the semantic video labels, and construct the vector index based on the vectorized descriptions.

Figure 8:
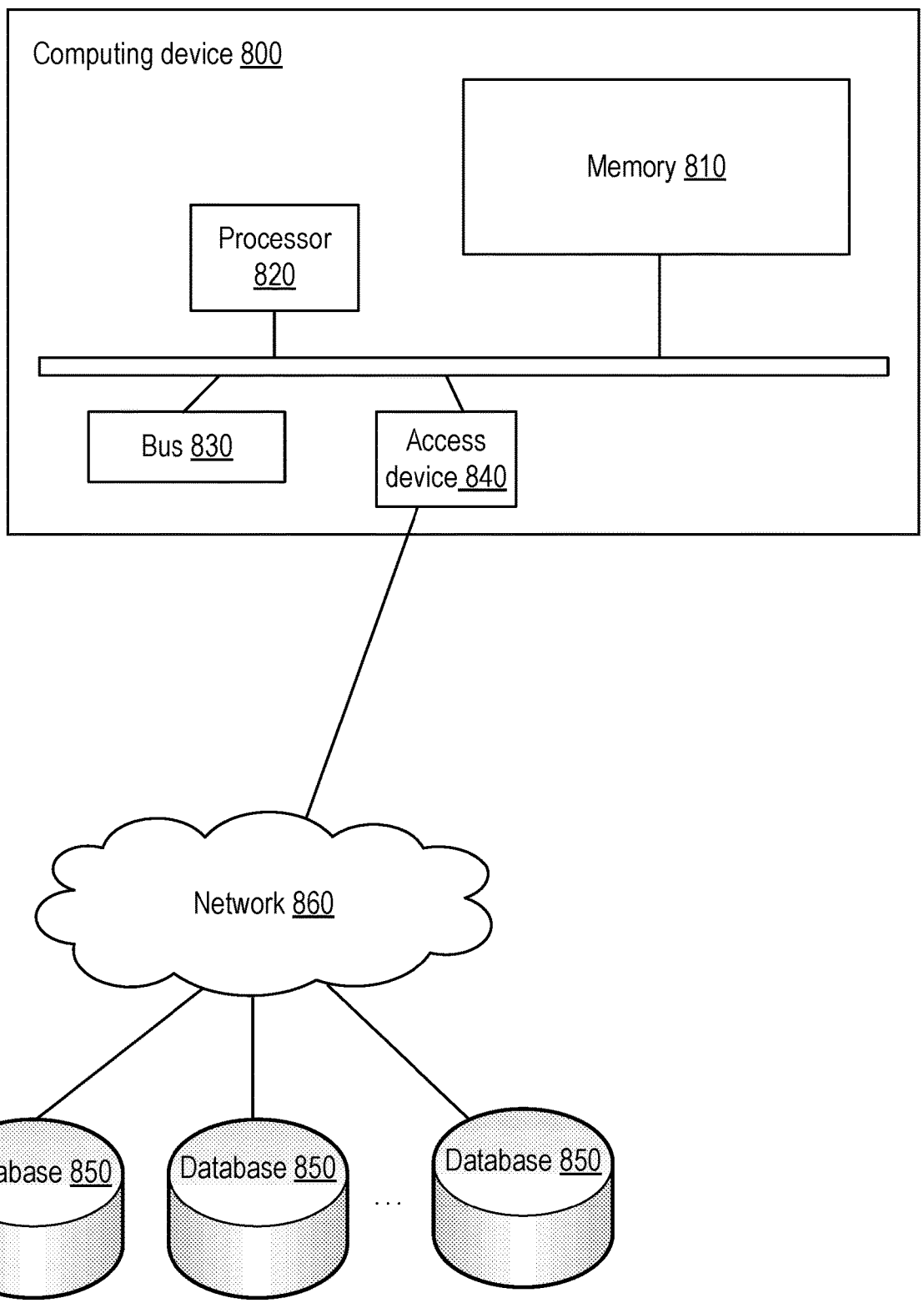
FIG. 8 is a block diagram illustrating a computing device according to some embodiments of the disclosure.

Details of the video search apparatus that are substantially similar to the above-described embodiments of index construction are note repeated herein. FIG. 8 is a block diagram illustrating a computing device according to some embodiments of the disclosure. In some embodiments and as shown in FIG. 8, the computing device (800) includes but are not limited to, a memory (810) and a processor (820). The processor (820) and the memory (810) are connected via a bus (830), and a database (850) is used to store data.

In some embodiments, the computing device (800) further includes an access device (840) that enables the computing device (800) to communicate via one or more networks (860). Examples of these networks include public switched telephone networks (PSTNs), local area networks (LANs), wide area networks (WANs), personal area networks (PANs), or a combination of communication networks such as the Internet. The access device (840) may include one or more of any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In one embodiment of the disclosure, the aforementioned components of the computing device (800) and other components not shown in FIG. 8 may also be connected to one another, for example, via a bus. It should be understood that the block diagram of the computing device shown in FIG. 8 is presented only for illustrative purposes, and is not intended to limit the scope of the disclosure. Those skilled in the art can add or replace any components as needed.

The computing device (800) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 800 may also be a mobile or stationary server.

In some embodiments, the processor (820) is configured to execute computer executable instructions stored in the memory (810) to perform the following: receiving a search request input by a user to search for a target video, the search request including multimodal search data for the target video; obtaining a processing result of the multimodal search data based on the multimodal search data; and providing the processing result of the multimodal search data with regard to a corresponding pre-constructed index to search to obtain the target video.

Details of the computing device that are substantially similar to the above-described embodiments of video searches are note repeated herein.

Figure 9:
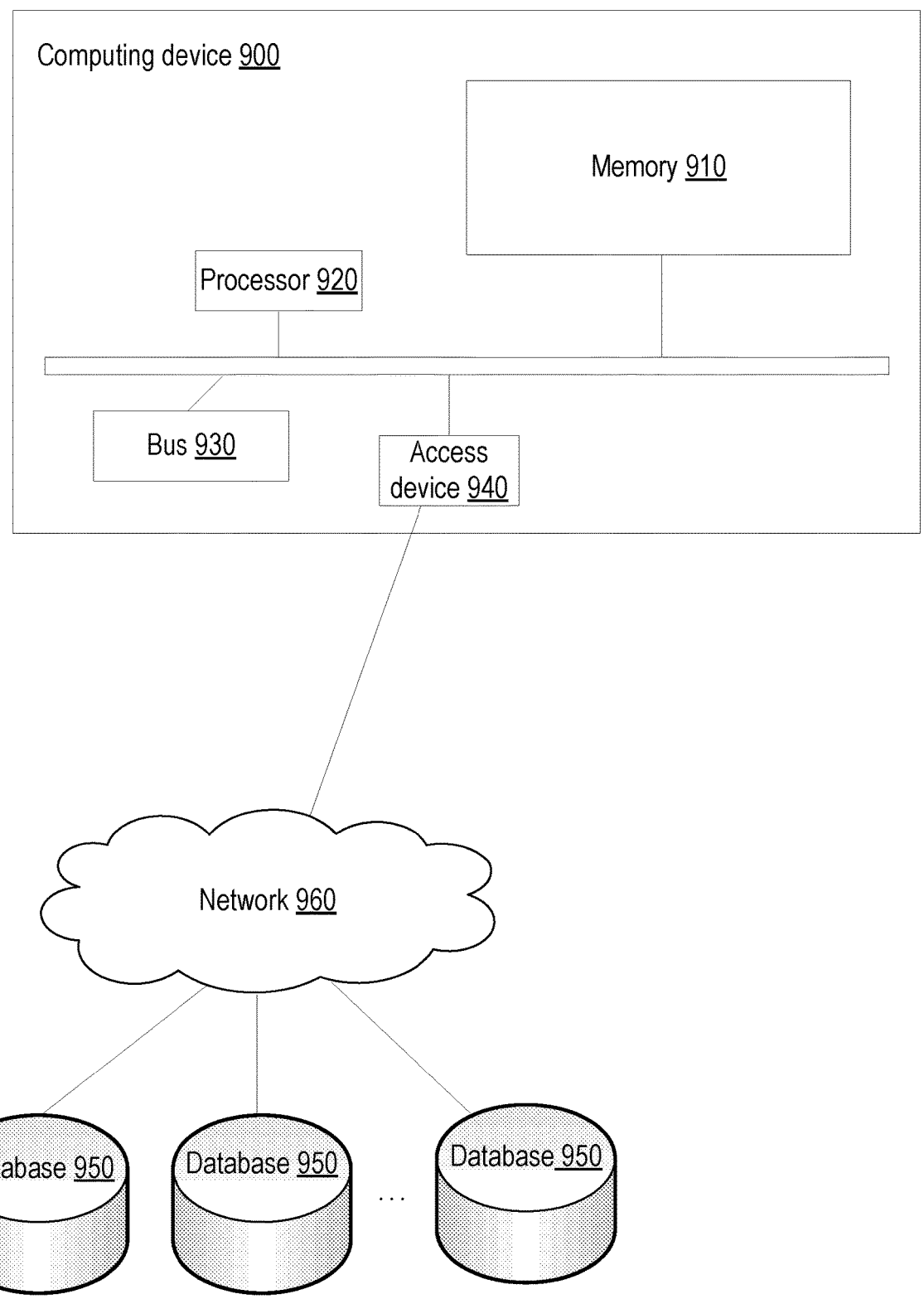
FIG. 9 is a block diagram illustrating a computing device according to some embodiments of the disclosure.

FIG. 9 is a block diagram illustrating a computing device according to some embodiments of the disclosure. In some embodiments and as shown in FIG. 9, the computing device (900) includes but are not limited to, a memory (910) and a processor (920). The processor (920) and the memory (910) are connected via a bus (930), and a database (950) is used to store data.

In some embodiments, the computing device (900) further includes an access device (940) that enables the computing device 900 to communicate via one or more networks (960). Examples of these networks include public switched telephone networks (PSTNs), local area networks (LANs), wide area networks (WANs), personal area networks (PANs), or a combination of communication networks such as the Internet. The access device 940 may include one or more any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In one embodiment of the disclosure, the aforementioned components of the computing device (900) and other components not shown in FIG. 9 may also be connected to one another, for example, via a bus. It should be understood that the block diagram of the computing device shown in FIG. 9 is presented only for illustrative purposes, and is not intended to limit the scope of the disclosure. Those skilled in the art can add or replace any components as needed.

The computing device (900) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 900 may also be a mobile or stationary server.

In some embodiments, the processor (920) is configured to execute computer executable instructions stored in the memory (910) to perform the following: receiving multimodal search data input by a user, the multimodal search data including text data, image data, video data, and/or audio data; obtaining a processing result of the multimodal search data based on the multimodal search data; and providing the processing result of the multimodal search data with regard to a corresponding pre-constructed index to search to obtain a target video associated with the multimodal search data.

Figure 10:
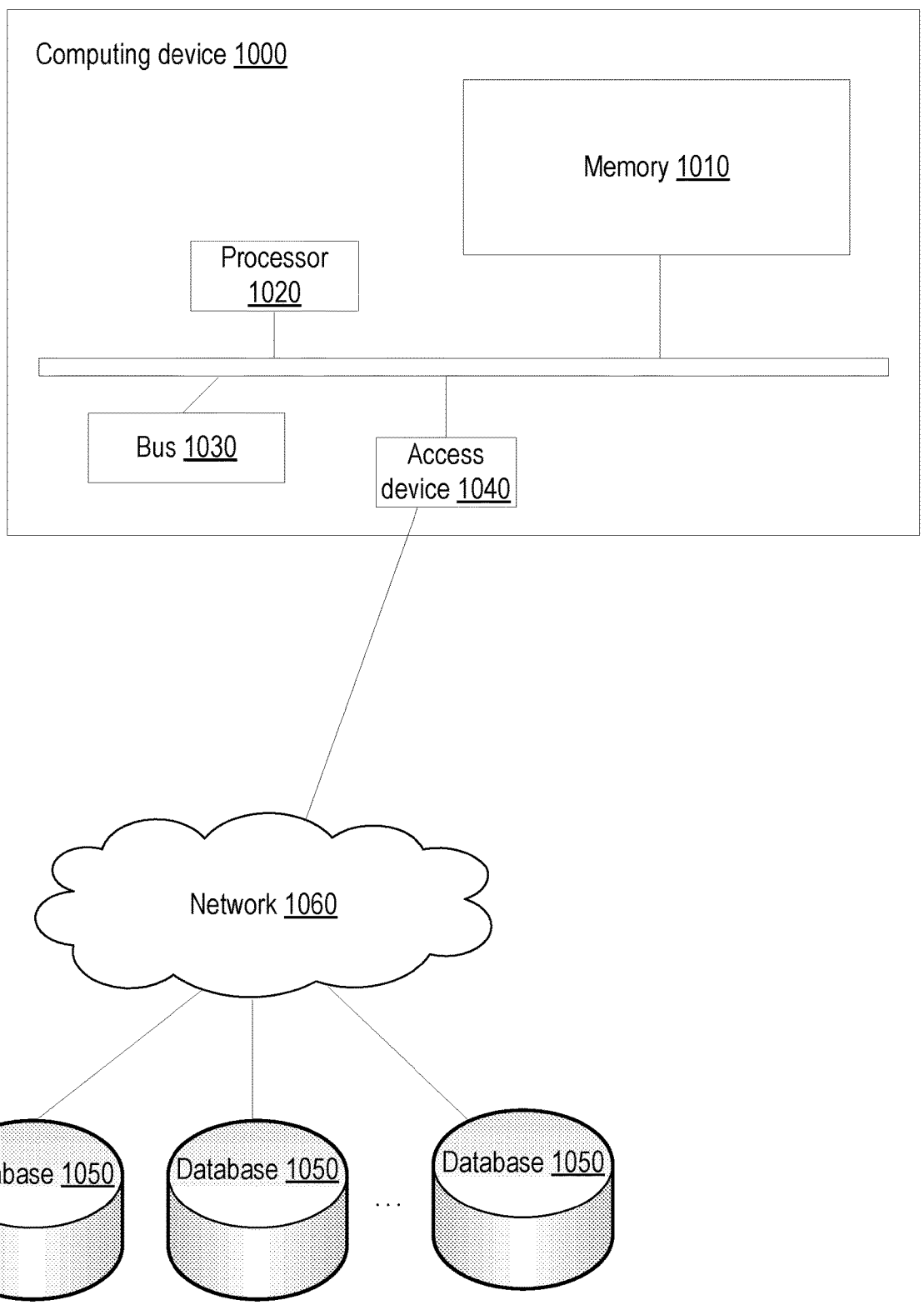
FIG. 10 is a block diagram illustrating a computing device according to some embodiments of the disclosure.

FIG. 10 is a block diagram illustrating a computing device according to some embodiments of the disclosure. In some embodiments and as shown in FIG. 10, the computing device (1000) includes but are not limited to, a memory (1010) and a processor (1020). The processor (1020) and the memory (1010) are connected via a bus (1030), and a database (1050) is used to store data.

In some embodiment, the computing device (1000) further includes an access device (1040) that enables the computing device (1000) to communicate via one or more networks (1060). Examples of these networks include public switched telephone networks (PSTNs), local area networks (LANs), wide area networks (WANs), personal area networks (PANs), or a combination of communication networks such as the Internet. The access device 1040 may include one or more any type of wired or wireless network interfaces (for example, a network interface card (NIC)), such as IEEE802.11 wireless local area network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In one embodiment of the disclosure, the aforementioned components of the computing device (1000) and other components not shown in FIG. 10 may also be connected to one another, for example, via a bus. It should be understood that the block diagram of the computing device shown in FIG. 10 is presented only for illustrative purposes, and is not intended to limit the scope of the disclosure. Those skilled in the art can add or replace any components as needed.

The computing device (1000) can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 1000 may also be a mobile or stationary server.

In some embodiments, the processor (1020) is configured to execute computer executable instructions stored on the memory (1010) to perform the following: obtaining video data, and process the video data into video metadata and video stream data; processing the video metadata based on a pre-configured text algorithm to obtain a text processing result of the video metadata; processing the video stream data based on a pre-configured video algorithm and vectorization model, respectively, to obtain a video processing result and a vectorization processing result of the video stream data; and constructing an inverted index based on the text processing result and the video processing result, and constructing a vector index based on the vectorization processing result.

Details of the computing device that are substantially similar to the above-described embodiments of index construction are note repeated herein. One embodiment of the disclosure further provides a computer-readable storage medium, storing computer instructions that, when executed by a processor, implement the steps of the video search method or implement the steps of the index construction method.

The foregoing is an illustrative solution of a computer-readable storage medium of the embodiment. It should be noted that the technical solution of the storage medium shares the same concept as that of the technical solution of the video search method or the index construction method described above. For content of the technical solution of the storage medium that is not described in detail, reference can be made to the description of the technical solution of the foregoing video search method or index construction method.

The specific embodiments in the description of the present application have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The computer instructions include computer program code, which may be in the form of source code, object code, executable files, or some intermediate forms. The computer-readable medium may include: any entity or device capable of carrying the computer program code, a recording medium, a USB flash disk, a mobile hard disk, a magnetic disk, an optical disc, a computer memory, a read-only memory (ROM), a random access memory (RAM), electrical carrier signals, telecommunication signals, and a software distribution medium. It should be noted that the content contained in the computer-readable medium can be appropriately added or deleted in accordance with the requirements of the legislation and patent practice in the jurisdiction. For example, in some jurisdictions, according to the legislation and patent practice, the computer-readable medium does not include electrical carrier signals and telecommunication signals.

It should be noted that for simplicity of description, the above method embodiments are all expressed as a combination of a series of actions, but those skilled in the art should know that the embodiments of the disclosure are not limited by the described sequence of actions, because some steps can be performed in other orders or simultaneously according to the embodiments of the disclosure. Furthermore, those skilled in the art should also know that the embodiments described herein are all preferred embodiments, and the involved actions and modules are not necessarily all required by the embodiments of the disclosure.

In the above embodiments, the description of each embodiment has its own emphasis. For parts that are not described in detail in a certain embodiment, reference can be made to related descriptions of other embodiments.

The preferred embodiments of the disclosure above are only disclosed to facilitate explanation of the disclosure. The details of the optional embodiments are not elaborated herein, and are not intended to be limiting. Obviously, many modifications and changes can be made according to the content of the embodiments of the disclosure. The disclosure selects and specifically describes these embodiments in order to better explain the principles and actual applications of the embodiments of the disclosure, so that those skilled in the art can understand and use the disclosure appropriately. The disclosure is limited only by the claims and the full scope and equivalents thereof.

The invention claimed is:

1. A method comprising:
   receiving a search request input by a user to search for a target video, the search request including multimodal search data for the target video;
   obtaining a processing result, utilizing a pre-configured algorithm, based on the multimodal search data, the processing result comprising one or more semantic labels for the multimodal search data generated by the pre-configured algorithm; and
   using the processing result to search a corresponding pre-constructed index, the pre-constructed index based on the processing result to obtain the target video.

2. The method of claim 1, the multimodal search data comprising text data and the obtaining a processing result of the multimodal search data comprising: processing the text data based on a pre-configured text algorithm to obtain a semantic text label of the text data.

3. The method of claim 1, the multimodal search data comprising image data and the obtaining a processing result of the multimodal search data comprising:
   processing the image data based on a pre-configured image algorithm to obtain a semantic image label of the image data; and
   processing the image data based on a pre-configured vectorization model to obtain a vectorized description of the image data.

4. The method of claim 1, the multimodal search data comprising video data, the method further comprising:
   processing the video data into video metadata and video stream data; and
   segmenting the video stream data into a sequence of video frames based on a pre-configured segmenting manner.

5. The method of claim 4, the obtaining a processing result of the multimodal search data based on the multimodal search data comprising:
   processing the video metadata based on a text algorithm to obtain a semantic text label of the video metadata;
   processing video frames in the sequence of video frames based on a pre-configured video algorithm to obtain semantic video labels of the video frames; and
   processing the video frames based on a vectorization model to obtain vectorized descriptions of the video frames.

6. The method of claim 2, the providing the processing result of the multimodal search data with regard to a corresponding pre-constructed index to search to obtain the target video comprising providing a semantic text label of text data with regard to a corresponding pre-constructed inverted index to search to obtain the target video.

7. The method of claim 3, the providing the processing result of the multimodal search data with regard to a corresponding pre-constructed index to search to obtain the target video comprising:
   providing the semantic image label with regard to a corresponding pre-constructed inverted index to search to obtain a first initial video;
   providing the vectorized description of the image data with regard to a corresponding pre-constructed vector index to search to obtain a second initial video; and
   obtaining the target video based on the first initial video and the second initial video.

8. The method of claim 5, the providing the processing result of the multimodal search data with regard to a corresponding pre-constructed index to search to obtain the target video comprising:
   providing the semantic text label of the video metadata with regard to a corresponding pre-constructed inverted index to search to obtain a third initial video;
   providing the vectorized descriptions of the video frames with regard to a corresponding pre-constructed vector index to search to obtain a fourth initial video; and
   obtaining the target video based on the third initial video and the fourth initial video.

9. The method of claim 7, the providing the semantic image label with regard to obtain a first initial video comprising:
   combining the semantic image label and the semantic text label of the text data to generate a combined label; and
   providing the combined label with regard to the corresponding pre-constructed inverted index to search to obtain the first initial video.

10. The method of claim 8, the providing the semantic text label of the video metadata with regard to a corresponding pre-constructed inverted index to search to obtain a third initial video comprising:
    combining the semantic text label of the video metadata, the semantic text label of the text data, and the semantic video labels of the video frames to generate a combined label; and
    providing the combined label with regard to the corresponding pre-constructed inverted index to search to obtain the third initial video.

11. The method of claim 1, the index being constructed by:
    obtaining video data;
    processing the video data into video metadata and video stream data;
    processing the video metadata based on a pre-configured text algorithm to obtain a text processing result of the video metadata;
    processing the video stream data based on a pre-configured video algorithm and vectorization model, respectively, to obtain a video processing result and a vectorization processing result of the video stream data;
    constructing an inverted index based on the text processing result and the video processing result; and
    constructing a vector index based on the vectorization processing result.

12. An apparatus comprising:
    a processor; and a storage medium for tangibly storing thereon program logic for execution by the processor, the stored program logic comprising:
  logic, executed by the processor, for receiving a search request input by a user to search for a target video, the search request including multimodal search data for the target video,
  logic, executed by the processor, for obtaining a processing result, utilizing a pre-configured algorithm, based on the multimodal search data, the processing result comprising one or more semantic labels for the multimodal search data generated by the pre-configured algorithm; and
  logic, executed by the processor, for using the processing result to search a corresponding pre-constructed index, the pre-constructed index based on the processing result to obtain the target video.

13. The apparatus of claim 12, the multimodal search data comprising text data; and the logic for obtaining a processing result of the multimodal search data comprising:
  logic, executed by the processor, for processing the text data based on a pre-configured text algorithm to obtain a semantic text label of the text data.

14. The apparatus of claim 12, the multimodal search data image data;
and the logic for obtaining a processing result of the multimodal search data comprising:
  logic, executed by the processor, for processing the image data based on a pre-configured image algorithm to obtain a semantic image label of the image data, and
  logic, executed by the processor, for processing the image data based on a pre-configured vectorization model to obtain a vectorized description of the image data.

15. The apparatus of claim 12, the multimodal search data video data; and
the logic for obtaining a processing result of the multimodal search data comprising:
  logic, executed by the processor, for processing the video data into video metadata and video stream data, and
  logic, executed by the processor, for segmenting the video stream data into a sequence of video frames based on a pre-configured segmenting manner.

16. The apparatus of claim 15, the logic for obtaining a processing result of the multimodal search data comprising:
  logic, executed by the processor, for processing the video metadata based on a text algorithm to obtain a semantic text label of the video metadata,
  logic, executed by the processor, for processing video frames in the sequence of video frames based on a pre-configured video algorithm to obtain semantic video labels of the video frames, and
  logic, executed by the processor, for processing the video frames based on a vectorization model to obtain vectorized descriptions of the video frames.

17. The apparatus of claim 12, the logic for providing the processing result of the multimodal search data with regard to a corresponding pre-constructed index to search to obtain the target video comprising: providing a semantic text label of text data with regard to a corresponding pre-constructed inverted index to search to obtain the target video.

18. A non-transitory computer-readable storage medium for tangibly storing computer program instructions capable of being executed by a computer processor, the computer program instructions defining the steps of:
  receiving a search request input by a user to search for a target video, the search request including multimodal search data for the target video;
  obtaining a processing result, utilizing a pre-configured algorithm, based on the multimodal search data the processing result comprising one or more semantic labels for the multimodal search data generated by the pre-configured algorithm; and
  using the processing result to search a corresponding pre-constructed index, the pre-constructed index based on the processing result to obtain the target video.

19. The computer-readable storage medium of claim 17, the multimodal search data comprising text data and the obtaining a processing result of the multimodal search data comprising: processing the text data based on a pre- configured text algorithm to obtain a semantic text label of the text data.

20. The computer-readable storage medium of claim 17, the multimodal search data comprising image data and the obtaining a processing result of the multimodal search data comprising:
  processing the image data based on a pre-configured image algorithm to obtain a semantic image label of the image data; and
processing the image data based on a pre-configured vectorization model to obtain a vectorized description of the image data.

21. The computer-readable storage medium of claim 17, the multimodal search data comprising video data, the method further comprising:
  processing the video data into video metadata and video stream data; and
  segmenting the video stream data into a sequence of video frames based on a pre-configured segmenting manner.

* * * * *